(12) United States Patent
Hocker et al.

(10) Patent No.: US 11,883,974 B2
(45) Date of Patent: Jan. 30, 2024

(54) PICK AND THROW HARVESTING

(71) Applicant: John Bean Technologies Corporation, Chicago, IL (US)

(72) Inventors: Jon A. Hocker, Bothell, WA (US); George R. Blaine, Lake Stevens, WA (US); Harrison T. Gill, Redmond, WA (US); Jonathan Keogh, Renton, WA (US); Erick A. Sorenson, Shoreline, WA (US)

(73) Assignee: John Bean Technologies Corporation, Chicago, IL (US)

( * ) Notice: Subject to any disclaimer, the term of this patent is extended or adjusted under 35 U.S.C. 154(b) by 355 days.

(21) Appl. No.: 16/786,680

(22) Filed: Feb. 10, 2020

(65) Prior Publication Data
US 2020/0254641 A1    Aug. 13, 2020

Related U.S. Application Data

(60) Provisional application No. 62/823,239, filed on Mar. 25, 2019, provisional application No. 62/803,824, filed on Feb. 11, 2019.

(51) Int. Cl.
*B26D 5/00* (2006.01)
*A22C 17/00* (2006.01)
(Continued)

(52) U.S. Cl.
CPC .......... *B26D 5/007* (2013.01); *A22C 17/0093* (2013.01); *A22C 21/0053* (2013.01);
(Continued)

(58) Field of Classification Search
CPC ...... B26D 7/1854; B26D 7/1863; B26D 7/27; B26D 7/32; B26D 7/06; B26D 7/0625;
(Continued)

(56) References Cited

U.S. PATENT DOCUMENTS 4,202,076 A * 5/1980 Rancatore ............ A22C 29/025
452/8
5,127,292 A * 7/1992 Kapoor ................ B26D 7/1854
83/100
(Continued)

FOREIGN PATENT DOCUMENTS

CN    102458133 A    5/2012
DE    10155127 A1    5/2002
(Continued)

OTHER PUBLICATIONS

Invitation to Pay Additional Fees mailed Jun. 16, 2020, in International Patent Application No. PCT/US2020/017520, filed Feb. 10, 2020, 15 pages.
(Continued)

*Primary Examiner* — Evan H Macfarlane
(74) *Attorney, Agent, or Firm* — Christensen O'Connor Johnson Kindness PLLC

(57) ABSTRACT

A conveyor system 24 carries work items, such as flexible, pliable, food products 22, through a scanning system 28 which generates data pertaining to various physical parameters of the food products. Thereafter, the food products are transported through a processing station which may be in the form of a portioning system 30. Next, the portioned food products are transported to a harvesting system 32 utilizing a actuator 34 to unload the food product portions 36 by vacuuming the portions into a nozzle 90. Such food products are transported to one or more desired locations through a hose/tube connected to a nozzle or may be launched through the air in a trajectory aimed at the desired placement location.

15 Claims, 17 Drawing Sheets

(51) Int. Cl.
*A22C 21/00* (2006.01)
*A22C 25/08* (2006.01)
*A22C 29/00* (2006.01)
*B26D 3/10* (2006.01)
*B26D 7/18* (2006.01)
*B26D 7/32* (2006.01)
*B65G 47/91* (2006.01)
*B26F 3/00* (2006.01)

(52) U.S. Cl.
CPC .............. *A22C 25/08* (2013.01); *A22C 29/00* (2013.01); *B26D 3/10* (2013.01); *B26D 7/1863* (2013.01); *B26D 7/32* (2013.01); *B65G 47/917* (2013.01); *B26D 2210/02* (2013.01); *B26F 3/004* (2013.01)

(58) Field of Classification Search
CPC .... B26D 7/0641; B26D 7/0658; B26D 7/018; B26D 2210/02; B26D 5/007; B26D 3/10; B65G 47/91; B65G 47/911; B65G 47/917; B65G 47/90–918; A22C 17/0093; A22C 21/0053; A22C 25/08; B07C 5/06; B07C 5/04; B25J 9/02; B25J 15/06; B25J 15/0616; B25J 15/0625; B25J 15/0633; B25J 15/0641; B25J 15/065; B25J 15/0658; B25J 15/0666; B25J 15/0675; B25J 15/0683; B25J 9/0093; B25J 9/0096; B25J 11/0045; B23Q 7/005; B23Q 7/006; B23Q 7/04; B23Q 7/043; B23Q 7/046; B23Q 7/048; B23Q 7/12; B26F 3/004
USPC .............. 414/751.1, 752.1, 737, 793.1, 797; 901/40; 294/64.2, 186, 183
See application file for complete search history.

(56) References Cited

U.S. PATENT DOCUMENTS

| | | | |
|---|---|---|---|
| 5,405,289 A * | 4/1995 | Schumann | A22C 21/0053 452/131 |
| 5,585,605 A | 12/1996 | Williams et al. | |
| 6,826,989 B1 | 12/2004 | Wattles et al. | |
| 6,866,417 B2 | 3/2005 | Gunawardena et al. | |
| 7,695,220 B2 * | 4/2010 | Bryan, Jr. | B65G 11/203 406/84 |
| 9,138,781 B1 | 9/2015 | Strong et al. | |
| 9,366,579 B2 | 6/2016 | Hocker et al. | |
| 9,778,651 B2 | 10/2017 | Strong et al. | |
| 9,974,235 B2 | 5/2018 | Van De Vegte et al. | |
| 10,016,790 B1 | 7/2018 | Travis et al. | |
| 11,253,893 B2 * | 2/2022 | Hogervorst | B25J 9/0093 |
| 2004/0173387 A1 | 9/2004 | Criscione, II et al. | |
| 2008/0279640 A1 | 11/2008 | Bryan, Jr. et al. | |
| 2011/0095551 A1 | 4/2011 | Downs et al. | |
| 2015/0205288 A1 | 7/2015 | Strong et al. | |
| 2017/0203443 A1 | 7/2017 | Lessing et al. | |
| 2017/0265392 A1 | 9/2017 | Van De Vegte et al. | |
| 2018/0065157 A1 | 3/2018 | Anup et al. | |
| 2022/0087106 A1 * | 3/2022 | Faulring | B25J 9/163 |

FOREIGN PATENT DOCUMENTS

| | | | | |
|---|---|---|---|---|
| EP | 0 619 249 A1 | 10/1994 | | |
| EP | 2 134 154 B1 | 3/2016 | | |
| WO | WO-2018006506 A1 * | 1/2018 | ............. | B21D 28/02 |
| WO | 2018022598 A1 | 2/2018 | | |

OTHER PUBLICATIONS

First Office Action dated May 9, 2022, issued in Chinese Patent Application No. 202080012863.4, filed Feb. 10, 2020, 28 pages.
International Search Report and Written Opinion dated Aug. 6, 2020, in International Patent Application No. PCT/US2020/017520, filed Feb. 10, 2020, 22 pages.
Second Office Action dated Mar. 20, 2023, issued in Chinese Patent Application No. 202080012863.4, filed Feb. 10, 2020, 28 pages.
Third Office Action dated Oct. 28, 2023, issued in Chinese Patent Application No. 202080012863.4, filed Feb. 10, 2020, 32 pages.

* cited by examiner

PICK AND THROW HARVESTING

CROSS-REFERENCES TO RELATED APPLICATIONS

This application claims the benefit of U.S. Provisional Application No. 62/823,239, filed Mar. 25, 2019, and the benefit of U.S. Provisional Application No. 62/803,824, filed Feb. 11, 2019, both of which applications are incorporated by reference herein in their entirety.

BACKGROUND

In the past, food products, such as raw meat, fish or poultry, that have been processed, for example, by cutting or portioning, have been manually harvested from moving conveyor belts. However, in manual harvesting, personnel often missed good portions, resulting in such portions becoming trim with the rest of the trim that remains on the belt after harvesting. Further, personnel may harvest trim rather than the actual good portions. Additionally, food products are often cut or portioned to more than one size per piece of raw material. However, manual harvesters often are not able to distinguish between different size or different weight pieces. In addition, the working conditions in food processing plants are not ideal. Typically the temperature at a trim or portioning station may be no more than 40° F. As a result, high turnover of personnel is not uncommon.

To overcome the disadvantages of manual harvesting, automatic harvesting devices have been developed. Such devices typically utilize suction cups to lift the portioned workpieces, such as raw, meat, fish or poultry, from the conveyor belt and then move the workpiece to a takeaway belt or perhaps a storage bin. In such automatic harvesting devices, a finite amount of time is required to pick up the food product off the conveyor belt and the move the product to a delivery location. Once the food product has been delivered, the pick up device must return to the conveyor belt in empty condition. In order to achieve a desired production rate, often multiple harvesting devices are needed thereby adding to both cost and the size of the harvesting station.

A further limitation of existing automatic harvesting devices is that takeaway conveyors or storage receptacles must be within reach of the harvesting device. This can result in a cumbersome situation, especially if the takeaway conveyors are higher in elevation than the production conveyor belt thereby requiring that the harvesting device be movable in the vertical direction. This can necessitate a more complicated and expensive and slower harvesting device than often is desirable.

Also, in these situations, where the takeaway conveyor must be placed within the reach of the harvesting device, the configuration of processing lines may be limited so that the takeaway conveyor can be close enough to the harvesting conveyor for automatic harvesting to be feasible. Larger harvesting robots can be utilized, but at a significant cost.

Moreover, using suction cups to pick up food products becomes more difficult the faster the food product must be moved. A high vacuum level need be generated to assist in gripping of the food product with the suction cups. However, marks may be left on the products from the suction cups and also more time and energy is required to generate the necessary vacuum level to operate the suction cups, especially for larger food products. Further, if high vacuum levels are needed to "grip" the food product, the likelihood of dropping the food product increases since even a small air leak past the product may cause insufficient gripping of the food product.

The present disclosure seeks to address the foregoing limitations of existing automatic harvesting systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a food processing system for processing food or work items that may be of variable size and shape, as the food or work items are being carried on a support surface of a conveyor, and removing the processed food or work items from the conveyor to deliver the food or work items to one or more desired locations, comprising:

(a) a scanning system for scanning the food or work items and generating data pertaining to the physical specifications of the food or work items including the size and shapes of the food or work items and the locations of the food or work items on the conveyor;

(b) a removal system for removing the food or work items from the conveyor to deliver the food or work items at a one or more desired locations, comprising:
   a first nozzle having an inlet opening shaped and sized to correspond to the shapes and sizes of the food or work items for receiving the food or work items into the first nozzle;
   a delivery subsystem in fluid receiving communication with the first nozzle for receiving the food or work items from the first nozzle and directing the food or work items in a desired direction or to a desired location;
   a vacuum generator generating a vacuum at the nozzle inlet opening; and
   an actuator to move and position the nozzle to desired positions relative to the food or work items; and (c) a control system receiving data from the scanning system including pertaining to the size and shape of the food or work items, and the location of the food or work items on the conveyor and controlling the actuator to position the nozzle with respect to the food or work item to enable the nozzle to pick up the food or work item, controlling the delivery subsystem to enable the delivery subsystem to deliver the food or work item at one or more desired locations; and controlling the operation of the vacuum generator.

In any of the embodiments described herein, further comprising:
   a food processing station located upstream from the removal system to process the food or work items being carried by the conveyor; and
   wherein the control system receiving data from the scanning system pertaining to the physical specifications of the food or work items germane to the processing of the food or work items at the food processing station and controlling the processing of the food or work items at the food processing station.

In any of the embodiments described herein, wherein the food processing station comprises a cutting system for cutting one or more portions from the food or work items; and the control system directing the cutting system to perform the required cuts of the food or work items.

In any of the embodiments described herein, wherein the delivery subsystem comprises a tubular member in fluid communication with the first nozzle, the tubular member having an outlet directed at or directable to a desired direction or to a desired location for delivery of the food or work items.

In accordance with an embodiment of the present disclosure, a harvester for a food processing system wherein variably sized and shaped food or work items being processed are carried on a conveyor, the food processing system including a scanning system for scanning the food or work items to generate data pertaining to the physical specifications of the food or work items, including the size and shape of the food or work items and the locations of the food or work items on the conveyor, the harvester removing the processed food or work items from the conveyor and delivering the removed food or work items at one or more desired locations, the harvester comprising:
  (a) a pickup system for picking up the food or work items from the conveyor, comprising:
    a nozzle having an inlet configuration based on the size and shape of the food or work items;
    a discharge subsystem in flow communication with the nozzle; and
    a vacuum source for creating a vacuum at the nozzle;
  (b) an actuator to optimally position the nozzle in desired position relative to the food or work items to facilitate picking up the food or work items with the nozzle; and
  (c) a control system for receiving data from the scanning system pertaining to the physical specifications of the food or work items, including the size and shape of the food or work items and the locations of the food or work items on the conveyor, and controlling the actuator to position the nozzle with respect to the food or work items to enable the nozzle to pick up the food or work item from the conveyor and controlling the discharge subsystem to place the food or work items at one or more desired locations.

In accordance with an embodiment of the present disclosure, a system for cutting portions from a variably sized and shaped and food or work items based on desired physical specifications of the cut portions and placing the cut portions at one or more desired locations, comprising:
  (a) a conveyor system for conveying the food or work items;
  (b) a scanning system for scanning the food or work items and generating data pertaining to physical specifications of the food or work items including the size and shape of the food or work items and the locations of the food or work items on the conveyor;
  (c) a cutting system for cutting one or more portions from the food or work items;
  (d) a pickup system for picking up the cut portions from the conveyor, comprising:
    a nozzle having an inlet configured based on the size and shape of the cut food or work items;
    a discharge subsystem in flow communication with the nozzle; and
    a vacuum source generating a vacuum at the nozzle inlet;
  (e) an actuator coupled to the nozzle to optimally place the nozzle in optimum position relative to the cut piece to facilitate picking up the cut piece with the nozzle; and
  (f) a control system:
    processing the scanned data to determine the physical characteristics of the food or work item including the size and shape of the food or work items and the locations of the food or work items on the conveyor;
    determining the cutting paths to cut the food or work items to achieve desired physical specifications of the cut portions;
    directing the cutting system to perform the determined cuts;
    directing the actuator to position the nozzle with respect to the food or work items to enable the nozzle to optimally pick up the cut portions; and
    controlling the discharge subsystem to deliver the cut food or work items at one or more desired locations.

In accordance with an embodiment of the present disclosure, a harvester for harvesting work items being processed are carried on a conveyor, the harvester removing the work items from the conveyor and delivering the removed work items at one or more desired locations, the harvester comprising:
  (a) a pickup system for picking up the work items from the conveyor, comprising:
    a nozzle having an inlet configuration based on the size and shape of the food or work items;
    a ballistic launcher in flow communication with the nozzle to launch the work items into the air at a trajectory to deliver the work items to one or more delivery locations; and
    a vacuum source for creating a vacuum at the nozzle sufficient to cause the work items to enter the nozzle and be launched from the ballistic launcher;
  (b) an actuator to optimally position the nozzle in desired position relative to the work items to facilitate picking up the work items with the nozzle; and
  (c) a control system controlling the actuator to position the nozzle with respect to the work items to facilitating the nozzle picking up the work item from the conveyor and controlling the ballistic launcher to deliver the work items at one or more desired locations.

In any of the embodiments described herein, wherein the discharge subsystem comprises a tubular member in fluid communication with the nozzle, the tubular member having an outlet directed at or directable to a desired direction or to a desired location for delivery of the food or work items.

In any of the embodiments described herein, further comprising an actuator acting on the outlet of the tubular member to direct the outlet at a desired direction or to a desired location for the delivery of the food or work items.

In any of the embodiments described herein, wherein the control system controlling the actuator acting on the outlet of the tubular member to direct the outlet at a desired direction or to a desired location for the delivery of the food or work items.

In any of the embodiments described herein, further comprising a vacuum generator positioned along the length of the tubular member to generate a vacuum upstream of the location of the vacuum generator and generate a positive pressure in the tubular member downstream of the location of the vacuum generator.

In any of the embodiments described herein, further comprising one or more pressure sensors operably connected to the tubular member to sense the pressure at one or more locations along the length of the tubular member.

In any of the embodiments described herein, wherein the tubular member comprises a member or a combination of members selected from the group consisting of: a rigid tube, a flexible tube, a hose, and a flexible hose.

In any of the embodiments described herein, wherein the delivery subsystem comprises a ballistic launcher in flow communication with the first nozzle to launch food or work items into the air at a trajectory to deliver the food or work items to one or more delivery locations.

In any of the embodiments described herein, wherein the pickup system comprises a ballistic launcher in flow communication with the nozzle to launch food or work items into the air at a trajectory to delivery of the food or work items to one or more delivery locations.

In any of the embodiments described herein, wherein the control system controlling the trajectory of the food or work item launched from the ballistic launcher.

In any of the embodiments described herein, further comprising a plurality of nozzles having inlet shapes and sizes to correspond to food or work items of different shapes and sizes, the plurality of nozzles detachably attachable to the actuator.

In any of the embodiments described herein, wherein the actuator operable by the control system to select a specific nozzle appropriate for the size and shape of the food or work items being processed.

In any of the embodiments described herein, wherein the control system controlling the vacuum generator to produce a vacuum at the first nozzle at a desired level and for a desired duration.

In any of the embodiments described herein, wherein the control system controlling the vacuum generator to produce a vacuum at the nozzle at a desired vacuum or air flow level and for a desired duration.

In any of the embodiments described herein, wherein the control system controlling the vacuum generator to pause the operation of the vacuum generator between sequential food or work items being picked up by the nozzle if sufficient time exists between the picking up of sequential food or work items.

In any of the embodiments described herein, wherein the inlet of the first nozzle resembles the shape of the food or work item when the nozzle is in a specific orientation relative to the food or work item.

In any of the embodiments described herein, wherein the shape of the nozzle inlet is generalized so that in at least two orientations of the first nozzle, the shape of the nozzle resembles the shape of the food or work item.

In any of the embodiments described herein, wherein the size and/or shape of the nozzle inlet is selected to be the same or smaller than the size and shape of food or work items to be received into nozzle.

In any of the embodiments described herein, wherein the size and/or shape of the nozzle inlet is selected so that the entire area, or substantially the entire area, of the nozzle inlet is covered of the food or work items to be received into nozzle.

In any of the embodiments described herein, wherein the size and/or shape of the nozzle inlet is selected so that at least 90 percent of the entire area of the nozzle inlet is covered of the food or work items to be received into the first nozzle.

In any of the embodiments described herein, wherein the size and/or shape of the nozzle inlet is selected so that at least 80 percent of the entire area of the nozzle inlet is covered of the food or work items to be received into the first nozzle.

In any of the embodiments described herein, wherein the size and/or shape of the nozzle inlet is selected so that at least 70 percent of the entire area of the nozzle inlet is covered of the food or work items to be received into the first nozzle.

In any of the embodiments described herein, wherein the nozzle comprises a plurality of inlet opening and the actuator indexes the nozzle so that a desired inlet opening is presented to the food or work item being removed.

In any of the embodiments described herein, further comprising pressure sensors operably associated with the first nozzle to sense the pressure within the first nozzle.

In any of the embodiments described herein, wherein a rim extends around at least a portion of the first nozzle inlet to project from the nozzle inlet, the rim having a thickness that reduces in the direction away from the nozzle inlet.

In any of the embodiments described herein, wherein a rim extends around at least a portion of the first nozzle inlet to project from the nozzle inlet, the rim being resiliently flexible so as to at least partially conform to the contour of the top surface of the food or work items.

In any of the embodiments described herein, wherein:
the conveyor defines a generally planar moving support surface; and
the control system controls the actuator to rotate the first nozzle about an axis normal to the conveyor support surface.

In any of the embodiments described herein, wherein the control system controls the actuator to also rotate the first nozzle about two perpendicular axes that are disposed parallel to the support surface of the conveyor.

In any of the embodiments described herein, wherein:
the removal system comprising:
a plurality of nozzles of different sizes or shapes;
an actuator for each nozzle; and
the control system controlling the actuators to pick up food or work items corresponding to the size and/or shape of the nozzle attached to the actuator.

In any of the embodiments described herein, wherein:
the pickup system comprising:
a plurality of nozzles of different sizes or shapes;
an actuator for each nozzle; and
the control system controlling the actuators to pick up food or work items corresponding to the size and/or shape of the nozzle attached to the actuator.

In any of the embodiments described herein, further comprising a skirt extending at least partially around the inlet of the nozzles to extend outwardly of the perimeter of the first nozzle.

In any of the embodiments described herein, wherein the skirt being resiliently flexible to apply a downward load on the food or work item located beneath the skirt and at least partially conforming to the topography of the top surface of the food or work item.

In any of the embodiments described herein, wherein the control system controls the actuator to position the nozzles with respect to the food or work item based on seeking to position the nozzle inlet so that the entire area of the nozzle inlet, or as much of the area of the nozzle inlet as possible, is within the perimeter of the food or work items, and so that the center of the nozzle coincides or nearly coincides with the centroid of the food or work item.

In any of the embodiments described herein, wherein the actuator is a robotic actuator having at least four degrees of movement.

In any of the embodiments described herein, wherein the actuator is capable of moving the nozzle in one or more directions selected from the group consisting of:
rotatable about an upright axis relative to the support surface of the conveyor;
in an upright direction transverse to the support surface of the conveyor;

in a direction transverse to the longitudinal direction of travel of the conveyor; and in a direction along the directional travel of the conveyor.

In any of the embodiments described herein, wherein the actuator comprises a delta robot having degrees of freedom of movement selected from the group consisting of three degrees of freedom of movement, four degrees of freedom of movement, and six degrees of freedom of movement.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
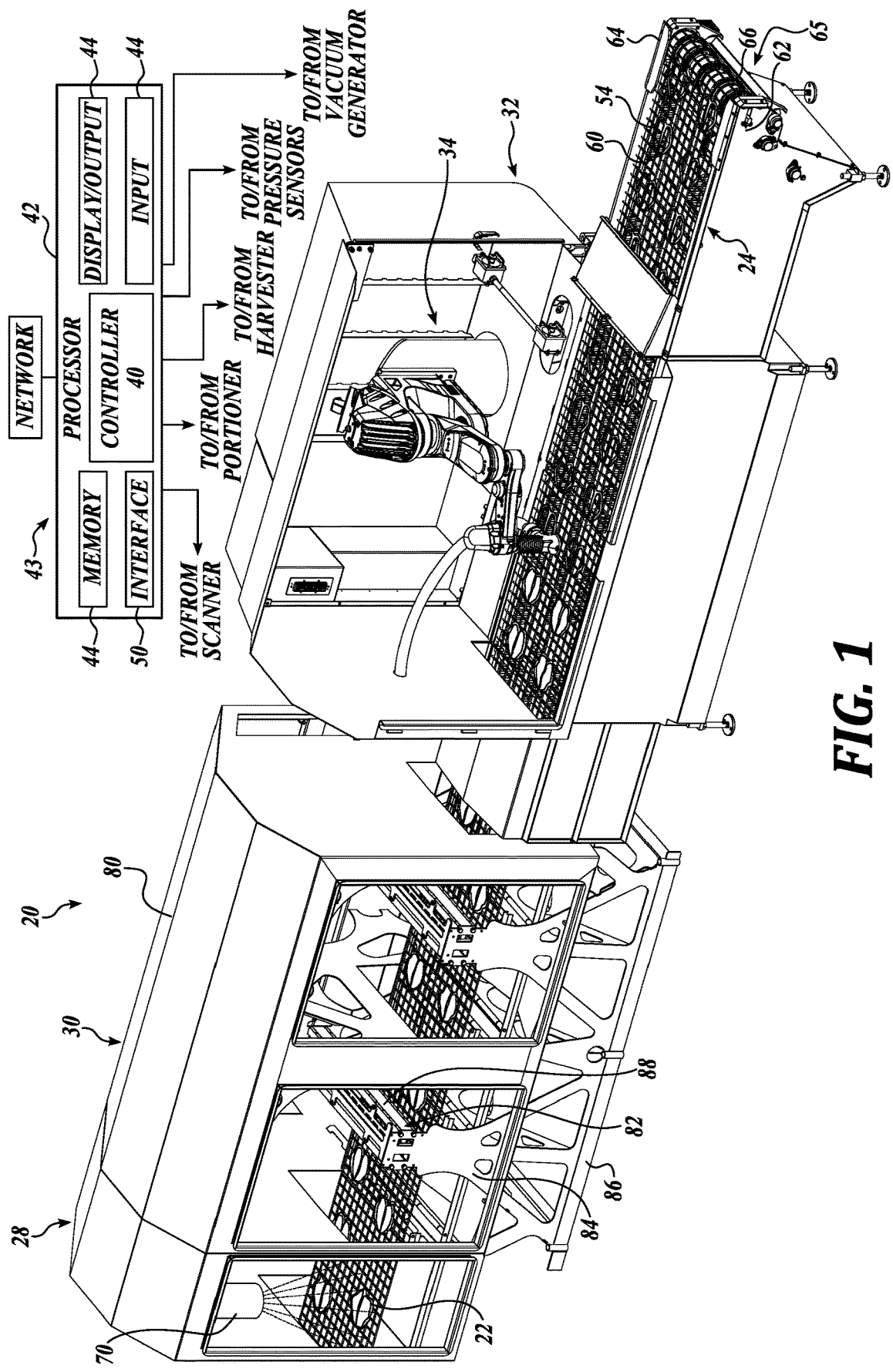
FIG. 1 is an isometric view, partially in schematic, illustrating an overall system of the present disclosure.
Figure 2:
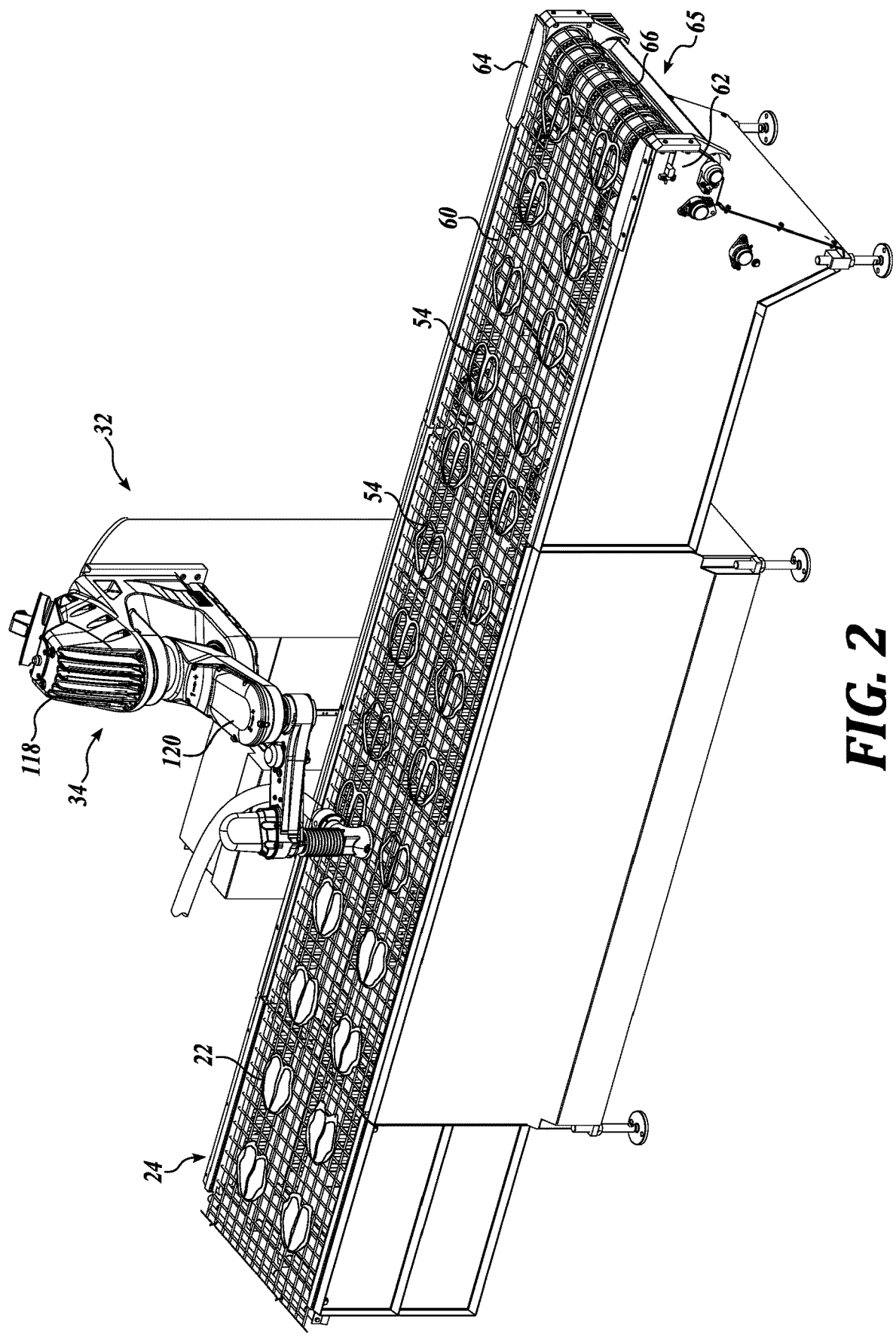
FIG. 2 is an enlarged fragmentary isometric view of FIG. 1 focusing on the harvesting system of the present disclosure.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, references to "food," "food products," "food pieces," and "food items," are used interchangeably and are meant to include all manner of foods. Such foods may include meat, fish, shellfish, poultry, fruits, vegetables, nuts, or other types of foods. Also, the present systems and methods are directed to raw food products, as well as partially and/or fully processed or cooked food products.

Further, the system, apparatus and methods disclosed in the present application and defined in the present claims, though specifically applicable to food products or food items, may also be used outside of the food area. Accordingly, the present application and claims reference "work products," "work items" and "workpieces," which terms are synonymous with each other. It is to be understood that references to work products and workpieces also include food, food products, food pieces, and food items.

The system and method of the present disclosure include the scanning of workpieces, including food items, to ascertain physical parameters of the workpiece comprising the size and/or shape of the workpiece. Such size and/or shape parameters may include, among other parameters, the length, width, aspect ratio, thickness, thickness profile, contour, outer contour, outer perimeter, outer perimeter configuration, outer perimeter size, outer perimeter shape, volume and/or weight of the workpiece. With respect to the physical parameters of the length, width, length/width aspect ratio, and thickness of the workpieces, including food items, such physical parameters may include the maximum, average, mean, and/or medium values of such parameters. With respect to the thickness profile of the workpiece, such profile can be along the length of the workpiece, across the width of the workpiece, as well as both across/along the width and length of the workpiece.

As noted above, a further parameter of the workpiece that may be ascertained, measured, analyzed, etc., is the contour of the workpiece. The term contour may refer to the outline, shape, and/or form of the workpiece, whether at the base or bottom of the workpiece or at any height along the thickness of the workpiece. The parameter term "outer contour" may refer to the outline, shape, form, etc., of the workpiece along its outermost boundary or edge.

The parameter referred to as the "perimeter" of the workpiece refers to the boundary or distance around a workpiece. Thus, the terms outer perimeter, outer perimeter configuration, outer perimeter size, and outer perimeter shape pertain to the distance around, the configuration, the size and the shape of the outermost boundary or edge of the workpiece.

The foregoing enumerated size and/or shape parameters are not intended to be limiting or inclusive. Other size and/or shape parameters may be ascertained, monitored, measured, etc., by the present system and method. Moreover, the definitions or explanations of the above specific size and/or shape parameters discussed above are not meant to be limiting or inclusive.

FIG. 1 schematically illustrates a system 20 implementing an embodiment of the present disclosure wherein food products 22 are harvested after processing. The system 20 includes a moving support surface in the form of a conveyor system 24 for conveying the food products in multiple lanes of windrows, extending along the conveyance system to be portioned, trimmed, cut, or processed in other ways. The conveyance system 24 initially carries the food products 22 through a scanning system 28 for scanning the food products and generates data pertaining to various physical parameters of the food products as discussed above. Thereafter, the food products 22 are transported through a processing system, which in FIG. 1 is illustrated as being in the form of a cutting/trimming/portioning system 30 (hereinafter for convenience simply referred to as portioning system 30). Next, the portioned food products 22 are transported to a harvesting system 32 whereas a robotic actuator 34 operates to unload the food product portions 36 by vacuuming into a nozzle and then transporting food product portions through a hose or tube or launching the food portions through the air, thereby placing such food portions at one or more desired locations, which, for example, may be in the form of one or more takeaway conveyors and/or one or more product receiving receptacles or bins.

The conveyor system 24, the scanning system 28, the portioning system 30, the harvesting system 32, including the robotic actuator 34 are coupled to and controlled by a controller 40 operated by a processor 42 of a processing system 43, as schematically shown in FIG. 1. The processing system 43 includes an input device 44 (keyboard, mouse, touchpad, etc.) and an output device 46 (monitor, printer). The processing system 43 also includes a memory unit 48 and an interface 50 for receiving signals and information from the conveyor system 24, scanning system 28, portioning system 30, harvesting system 38, including robotic actuator 34 as well as from other data sources of system 20, as described more fully below. The processor 42 may be connected to a network 52. Also, rather than employing a local processor 42, a network computing system can be used for this purpose.

Generally, the scanning system 28 includes a scanner for scanning the food products 22 to produce data relating to or representative of the physical specifications of the food product 22, and forwards this data to the processor 42. The processor, using a scanning program, analyzes the scanning data to determine the location of the food products 22 on the conveyance system and develops physical parameters of the scanned food products, in including for example, a length, width, area, and/or volume distribution of the scanned food product. The processor may also develop a thickness profile of the scanned food products as well as the overall shape and size of the food products. The processor 42 can then model the food products to determine how the food products may be divided, trimmed, and/or cut into end pieces or portions 36 composed of specific physical criteria, including, for example, shape, area, weight and/or thickness. In this regard, the processor 42 may take into consideration that the thickness of the food products 22 may be altered either before or after the work products are cut at the portioning station 30 by a slicer, not shown. The processor 42, using the scanning program and/or portioning program, determines how the food products may be portioned into one or more end products 36 or end product sets. The controller 40 then functions to control the cutter system 30 to portion the food products 22 according to desired end product pieces 36 and then the controller controls the harvesting of the portioned food pieces 36 from the conveyor system and the placing of the portioned food pieces 36 at one or more desired locations either away from the conveying system 24 or back onto the conveying system after the trim 54 has been removed.

Next, describing the system 20 in more detail, the conveyance system 24 includes a moving belt 60 that slides over an underlying support or bed 62. The belt 60 is driven by drive rollers (not shown) mounted on a frame structure 64 that also carries a conveyor belt bed 62. The drive rollers are in turn driven at a selected speed by a drive motor (not shown) in a standard manner. The drive motor can be composed of a variable speed motor to thus adjust the speed of the belt as desired as the food products are carried past the scanning system 28, the portioning system 30, and the harvesting system 32. At the outlet end 65 of the conveyor system 24, the belt 60 trains around idler rollers 66 mounted on the frame structure 64 in a standard manner.

An encoder, not shown, is integrated into the conveyance system 24, for example, at the drive rollers to generate electrical pulses at fixed distance intervals corresponding to the forward movement of the conveyor belt 60. This information is routed to the processor 42 so that the location(s) of the food products 22, or the portions 36 cut from the food products, can be determined and monitored as the food products or portions travel along the conveyor system 24. This information can be used to position cutters of the portioning system 30 as well as the components of the harvesting system 32, including the robotic actuator 34.

The scanning system 28 can be of various configurations or types, including a video camera (not shown) to view the food products illuminated by one or more light sources 70. Light from the light sources 70 is extended across the moving conveyor belt 60 to define a sharp shadow or light stripe line, with the area forwardly of the transverse beam being dark. When no food product 22 is being carried by the conveyor belt 60, the shadow of the light stripe forms a straight line across the conveyor belt. However, when the food product 22 passes across the shadow line/light stripe, the upper, irregular surface of the food product produces an irregular shadow line/light stripe as viewed by the video camera angled downwardly on the food product and the shadow light/light stripe. The video camera directs the displacement of the shadow line/light stripe from the position it would occupy if no food product were present on the conveyor belt 60. This displacement represents the thickness of the food product along the shadow line/light stripe. The length of the food product is determined by the distance of the belt travel that the shadow line/light stripes are created by the food product. In this regard, the encoder, which is integrated into the conveyance system, generates pulses at fixed distance intervals corresponding to the forward movement of the conveyor belt 60.

In lieu of a video camera, the scanning system 28 may instead utilize an X-ray apparatus (not shown) for determining the physical characteristics of the food product 22, including its shape, mass and weight. X-rays may be passed through the object in the direction of an X-ray detector (not shown). Such X-rays are attenuated by the food product in proportion to the mass thereof. The X-ray detector is capable of measuring the intensity of the X-rays received by the detector, after passing through the food product. This attenuation is utilized to determine the overall shape and size of the food product 22 as well as its mass. An example of such an X-ray scanning device is disclosed in U.S. Pat. No. 5,585,605, incorporated by reference herein.

The foregoing scanning systems are known in the art, and thus are not novel per se. However, use of these scanning systems in conjunction with other aspects of the described embodiments is believed to be new.

The data and information measured/gathered at the scanning system 28 is transmitted to the processor 42 which records and/or notes the location of the food products on the conveyor 24 as well as data pertaining to physical parameters of the food products as discussed above. With this information, the processor, operating, for example, under the scanning system software, can develop an area profile as well as a volume profile of the food products. Knowing the density of the food products, the processor can also determine the weight of the food products or segments or sections or portions thereof.

Although the foregoing description discusses scanning by use of a video camera and a light source as well as by use of X-rays, other three-dimensional scanning techniques may be utilized. For example, such additional techniques may be by ultrasound or mire fringe methods. In addition, electromagnetic imaging techniques may be employed. Thus, the present invention is not limited to the use of video cameras or X-ray methods but encompasses other three-dimensional scanning technologies.

In system 20, the food products 22 can be processed in various ways. One example is illustrated in FIG. 1 wherein the food products are processed by the cutting/trimming and/or portioning thereof at portioning system 30. The conveying system 24 carries the food products 22 through the portioning system 30 whereat the food products are cut or trimmed or portioned into desired end pieces 36.

The portioning station includes a housing 80 to enclose cutting units 82, which are mounted above the conveyor 24 by frame systems 84 that extend upwardly from a base 86 to support the ends of the cutter units 82 which span across the conveyor belt 60. The cutting units can be of various types, including in the form of high pressure liquid nozzle assemblies, not shown, which are mounted on carriers or carriages which move across the conveyor belt on a transverse support system 88. The carriers may also be moveable along the length of the conveyor belt. Examples of such support systems are disclosed by U.S. Pat. No. 9,778,651, incorporated herein by reference, as well as U.S. Pat. No. 6,826,989, also incorporated herein by reference.

It is to be understood that the system 20 may include other types of food processing systems, including a slicing apparatus to slice food products to desired thicknesses, a flattening apparatus to flatten food products to a desired thickness, a thermal processing system to heat or cool the food product, etc. Once the processing of the food product occurs, the harvesting system 32 is used to harvest the food products 22 or portions thereof 36 thereby to place the food products or portions thereof at one or more desired locations. In the system 20 illustrated in the figures of the present application, the food products 22 are shown as portioned into a plurality of pieces 36 at the portioning system 30. A certain amount of trim 54 typically results from the cutting/portioning of the food products into desired pieces.

The harvesting system is capable of separating the cut pieces 36 from the trim 54 and then transporting the cut pieces to one or more desired locations. Moreover, the harvesting system 34 is able to carry out this function more quickly and efficiently in that existing devices that must first picking up the food pieces from a conveyor and then traveling to the delivery destination of the food pieces, as in standard "pick-and-place" system. In standard systems, the mechanism for picking the food product must then physically transfer the food product to a desired drop off location and then travel back to the conveyor to pick up the next food product piece.

Figure 6:
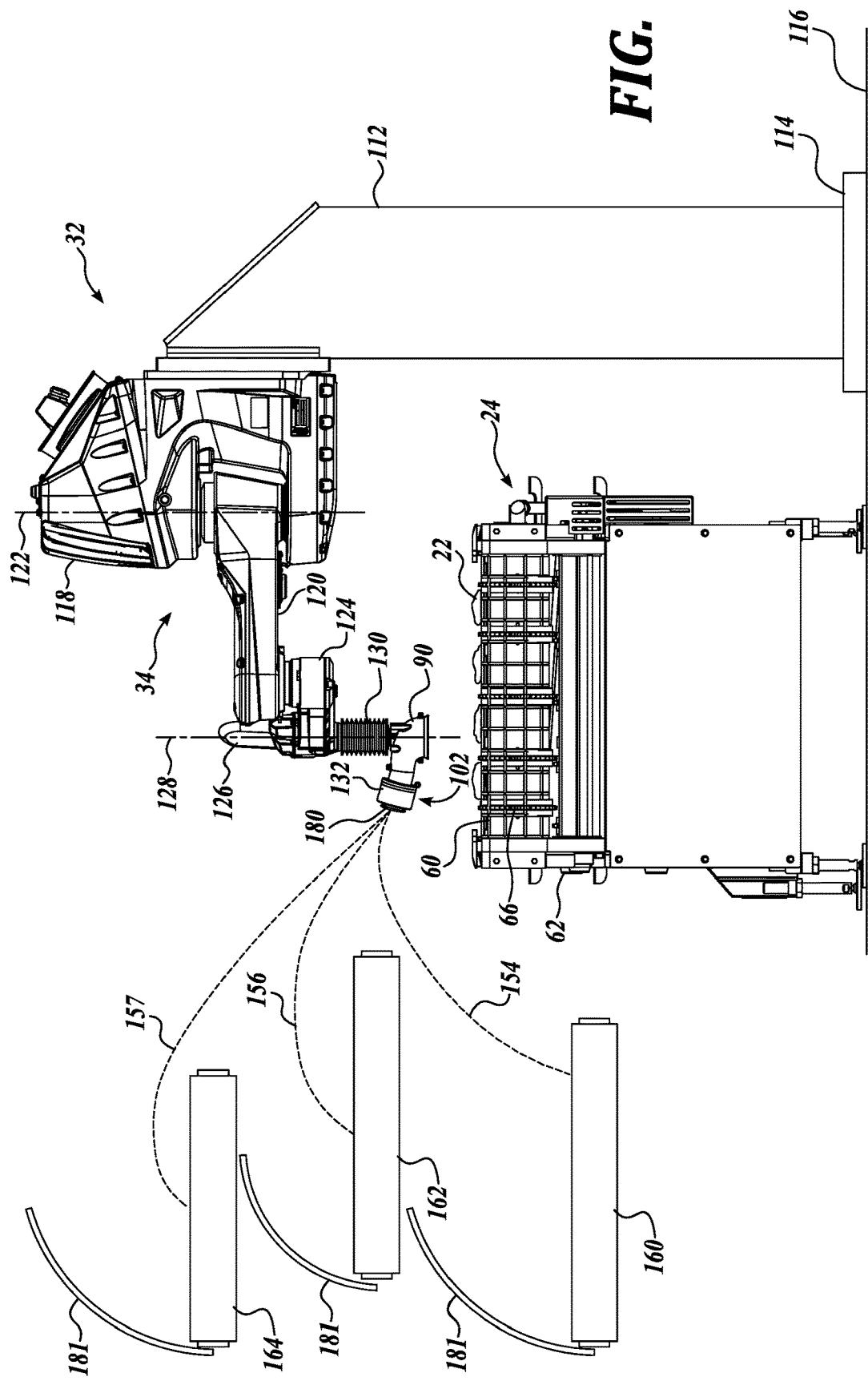
FIG. 6 is a view similar to FIG. 3 wherein the food products are launched through the air to be placed on various takeaway conveyors.
Figure 7:
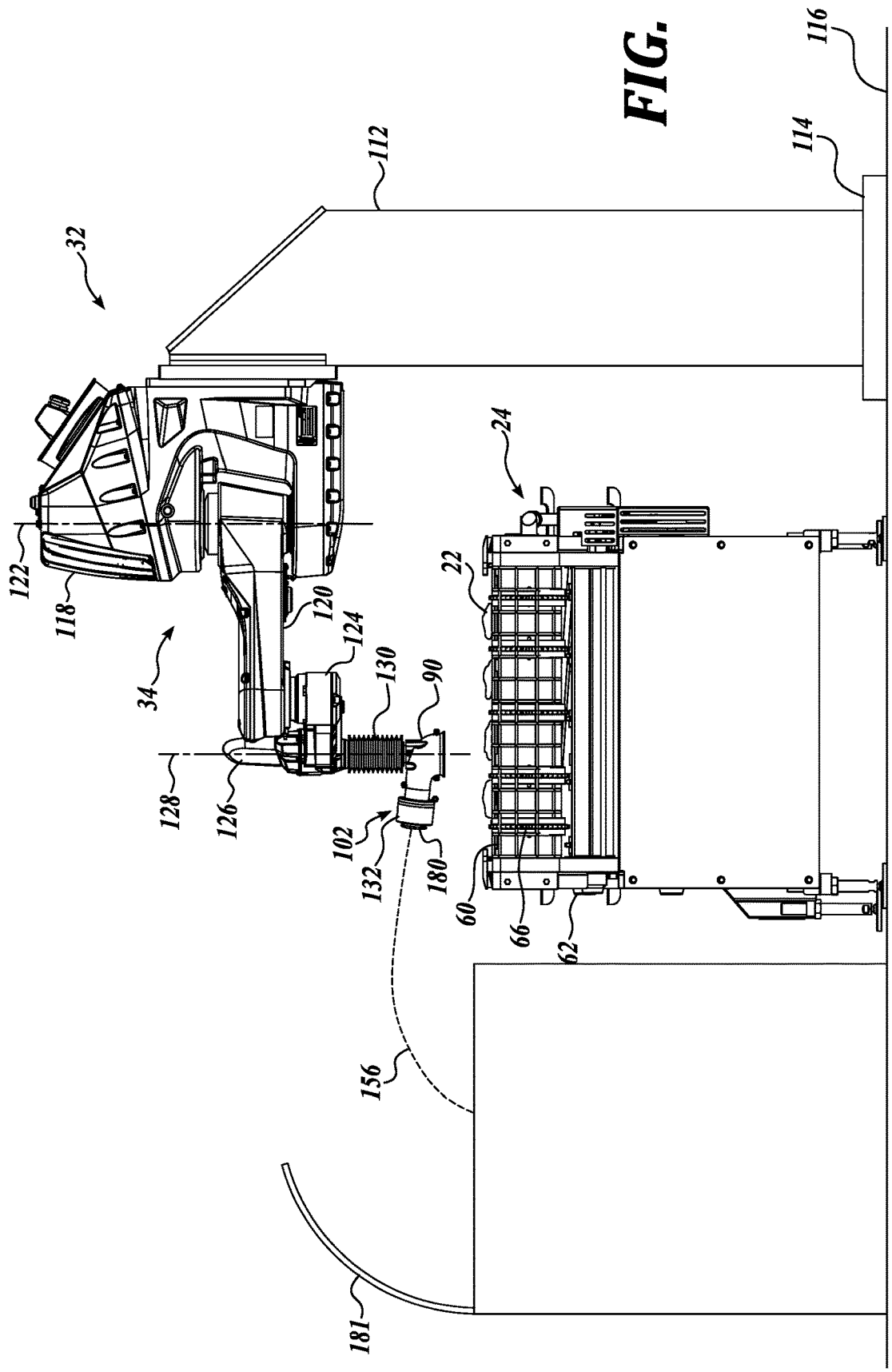
FIG. 7 is a view similar to FIG. 6 wherein the food products are launched through the air to be placed in storage bins.
Figure 8:
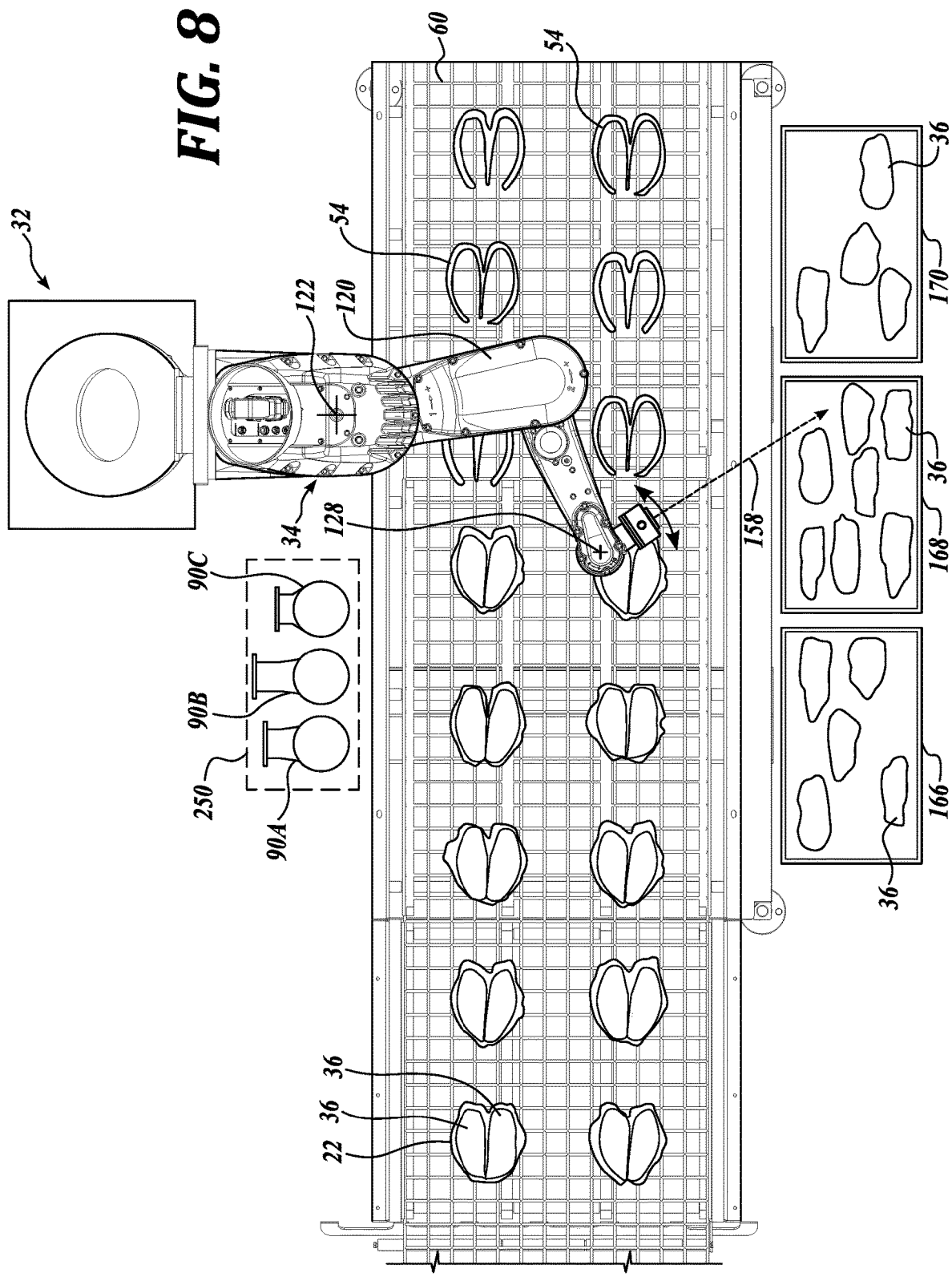
FIG. 8 is a plan view of FIG. 7.
Figure 9C:
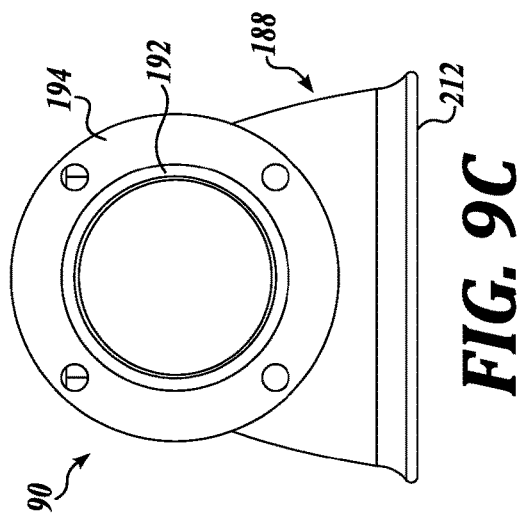
FIGS. 9A-9H illustrate an example of a suction nozzle of the present disclosure.
Figure 9D:
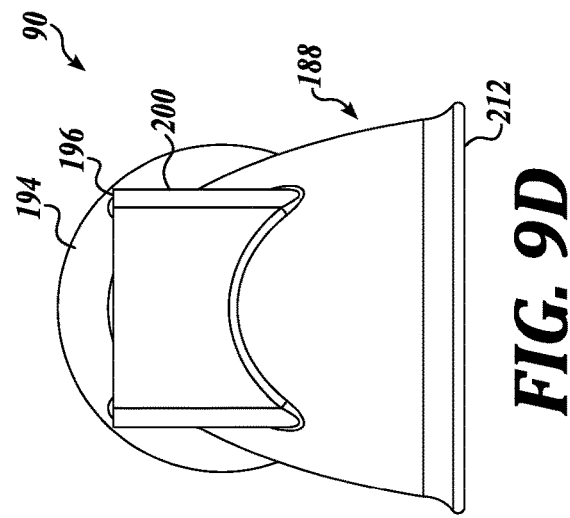
Figure 9A:
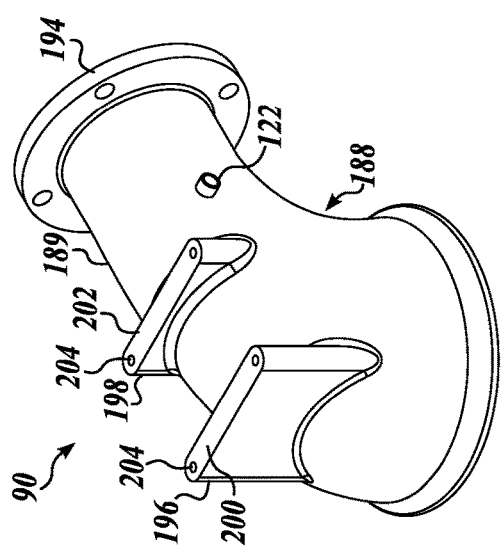
Figure 9B:
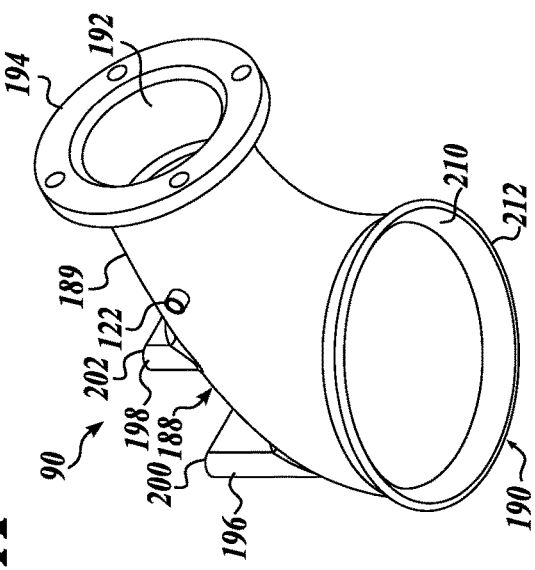
Figure 9G:
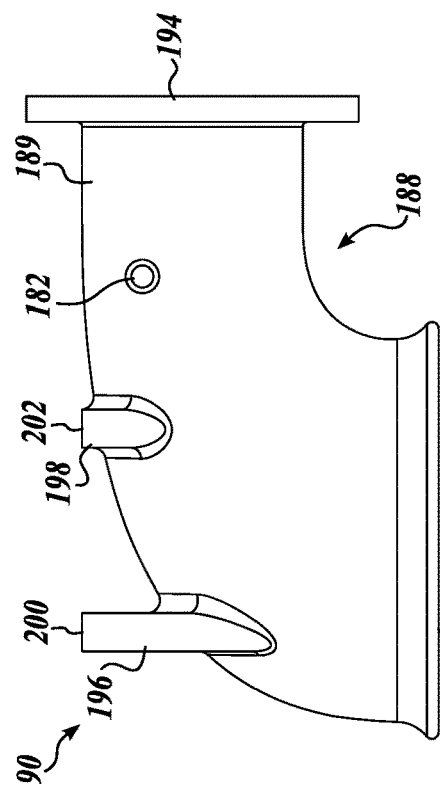
Figure 9H:
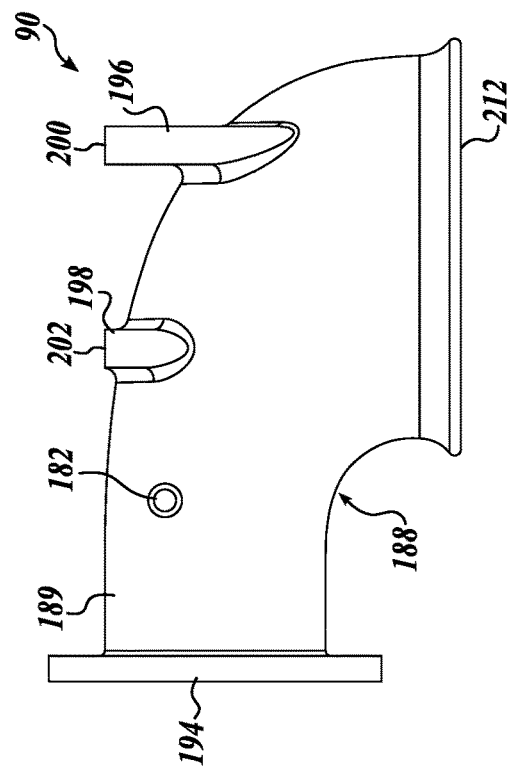
Figure 9E:
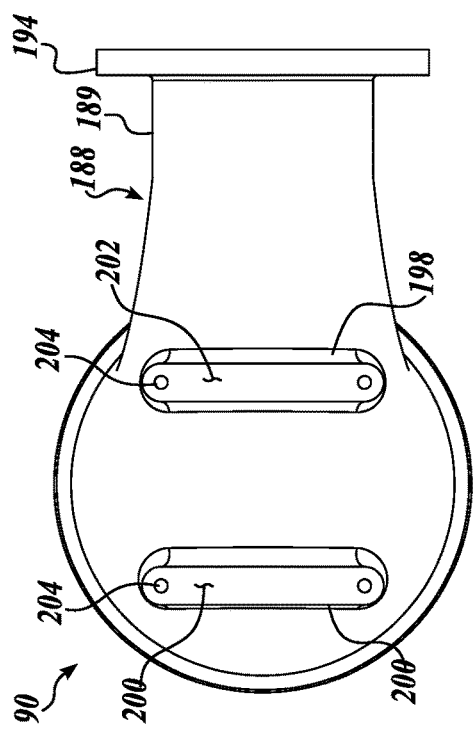
Figure 9F:
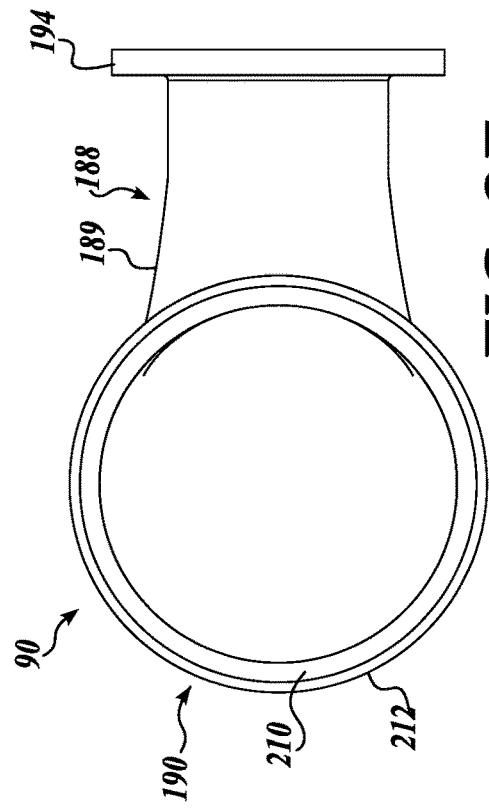

As shown in the figures, harvesting system 32 basically includes multi-axis robotic actuator 34 which carries and manipulates a vacuum nozzle 90 which is designed to suck or vacuum up the work product pieces through the nozzle and transmit the work product pieces to a delivery subsystem 92. The delivery subsystem can be of various configurations, including a delivery tube in the form of a rigid, partially rigid or flexible tube or hose 100 shown in FIGS. 1-5 or a ballistic launcher 102 as shown in FIGS. 6-8, as discussed more fully below.

The robotic actuator 34 includes a base unit 110 mounted on an upright mounting post 112 extending upwardly from a base plate 114 secured to floor 116. The base unit 110 may be operable to move at least vertically relative to the mounting post 112. The base unit 110 includes a motor disposed within an upper housing 118 for rotating an inward arm 120 about a vertical axis 122. The motor disposed within the housing 118 can be of various types, including electrically or pneumatically powered to operate the inward arm 120 at very high speeds.

The robotic actuator 34 also includes an outward arm 124 rotatably coupled to the distal end of the inward arm 120 and rotatable at high speed relative to the inward arm by a rotary actuator, not shown.

An actuating head 126 is rotatably mounted on the distal end of outward arm 124 to rotate about vertical axis 128 also at high speed and also to raise and lower toward and away from the conveyor belt 60. This vertical movement can be accomplished by a telescoping arrangement or by other means protected by an exterior flexible bellows 130. The lower end of the actuating head 126 is mounted to nozzle 90.

Although the robotic actuator 34 is illustrated as having four degrees of freedom, the robotic actuator can be configured with at least six degrees of freedom, including the ability to rotate the actuator head about two axes extending substantially parallel to the horizontal. With this additional movement, the nozzle 90 could be tilted about the horizontal relative to the carrying surface of conveyor belt 60.

FIGS. 1-5 depict the delivery subsystem 92 in the form of a tube or hose 100 having an inlet end in fluid communication with nozzle 90. A vacuum generator 132 is disposed between the nozzle 90 and the inlet of tube/hose 100. The vacuum generator 132 creates a vacuum at the inlet of the nozzle 190 and optionally a positive pressure in the hose/tube 110 downstream of the vacuum generator.

Various types of vacuum generators may be utilized. In one form, the vacuum generator may include an air mover wherein compressed air is blown through an annular space forming a ring around a hose/tube attachment. The air pressure is converted into air flow through the air mover which entrains and moves air into the tube/hose 100. Both the size of the annular space in the air mover and the pressure can be varied to provide different rates of air flow. Such air movers rely on a relatively high rate of air flow to create a suction force at the inlet nozzle 90, rather than a high level of vacuum generated by a vacuum generator. The relatively high rate of air flow helps keep the orifices of the vacuum/air flow generator free from the being plugged by the food product, including fat and debris from the food product.

It is to be understood that a vacuum can be created at the inlet of nozzle 190 so that atmosphere pressure is sufficient to lift the harvested food product items 36 from the conveyor belt 60 and into the nozzle 90 and through the tube/hose 100. As such, air pressure above atmospheric pressure may not be needed in the delivery subsystem 92.

The controller 40 may be utilized to control both the volume of air flow and the pressure of air flow to the air mover and thus control the vacuum level generated at the nozzle 90. Air movers such as that described above are articles of commerce.

Although the air mover/vacuum generator 132 is shown as being at the connection between the nozzle 90 and tube/hose 100, the vacuum generator can instead be located along the length of the hose/tube, or even at or toward the outlet end of the hose/tube.

Further, more than one vacuum generator may be utilized, for instance, a first vacuum generator may be positioned at the connection between the nozzle 90 and the tube/hose 100 and a second vacuum generator positioned downstream along the length of the hose/tube. Use of multiple vacuum generators can increase the rate of transfer of the workpieces through the hose/tube so as to achieve a desired harvesting rate.

Figure 4:
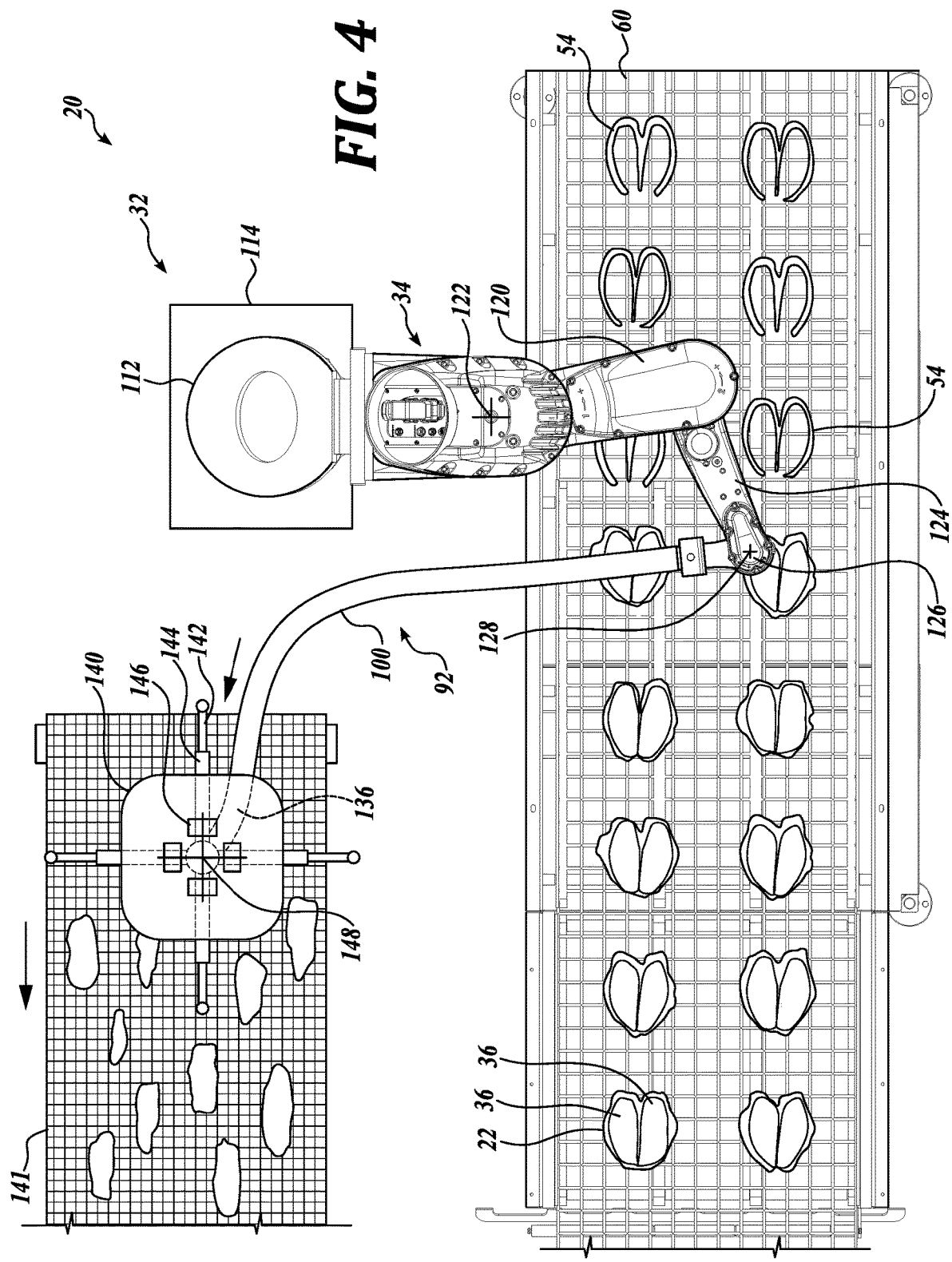
FIG. 4 is a plan view of FIGS. 2 and 3 illustrating portioned food products removed to a takeaway conveyor.

In FIG. 4, the outlet end 136 of the tube/hose is coupled to a delta robot 140 which is mounted above or adjacent a takeaway conveyor 141 to deposit the cut workpieces 36 on the conveyor in various lanes depending on different factors, including one or more physical parameters of the harvested workpieces. For example, harvested workpieces may be positioned in different lanes along the takeaway conveyor 141 depending on weight, size, thickness, length, and/or width, etc. The controller 40 is aware of the parameter or parameters in question from the scanning data and from operation of the portioning system 30. As such, when the robotic actuator 34 picks up the workpiece portion 36 from conveyor belt bed 62, the controller 40 controls the delta robot 140 so that the portion piece 36 in question is positioned in the correct lane of the takeaway conveyor 141.

Delta robots such as robot 140 are articles of commerce. Very briefly, robot 140 is composed of four sets of lower arms 142 that are connected at their upper ends to an upper powered pivot arms 144 which in turn are connected to rotary actuators 146 that are powered to rotate about a horizontal axis. Each of the four pivot arms 144 extends outwardly from a central axis 148 in a quadrant arrangement. The lower or distal ends of the lower extension arms 142 are connected to a carrier head or attachment, not shown, to which the outlet/distal end 136 of the tube/hose 100 is attached.

The delta robot 140 is capable of moving the outlet end 136 of the hose/tube laterally across the conveyor 141, longitudinally along the length of the conveyor 141, as well as vertically relative to the conveyor. The delta robot is also capable of moving the distal end of the hose/tube diagonally relative to the plane of the conveyor surface as well as diagonally relative to the vertical. As such, the delta robot is capable of positioning the harvested workpieces 36 on the conveyor 141 very precisely and quickly so as to keep pace with the operation of the robot actuator 34.

Figure 5:
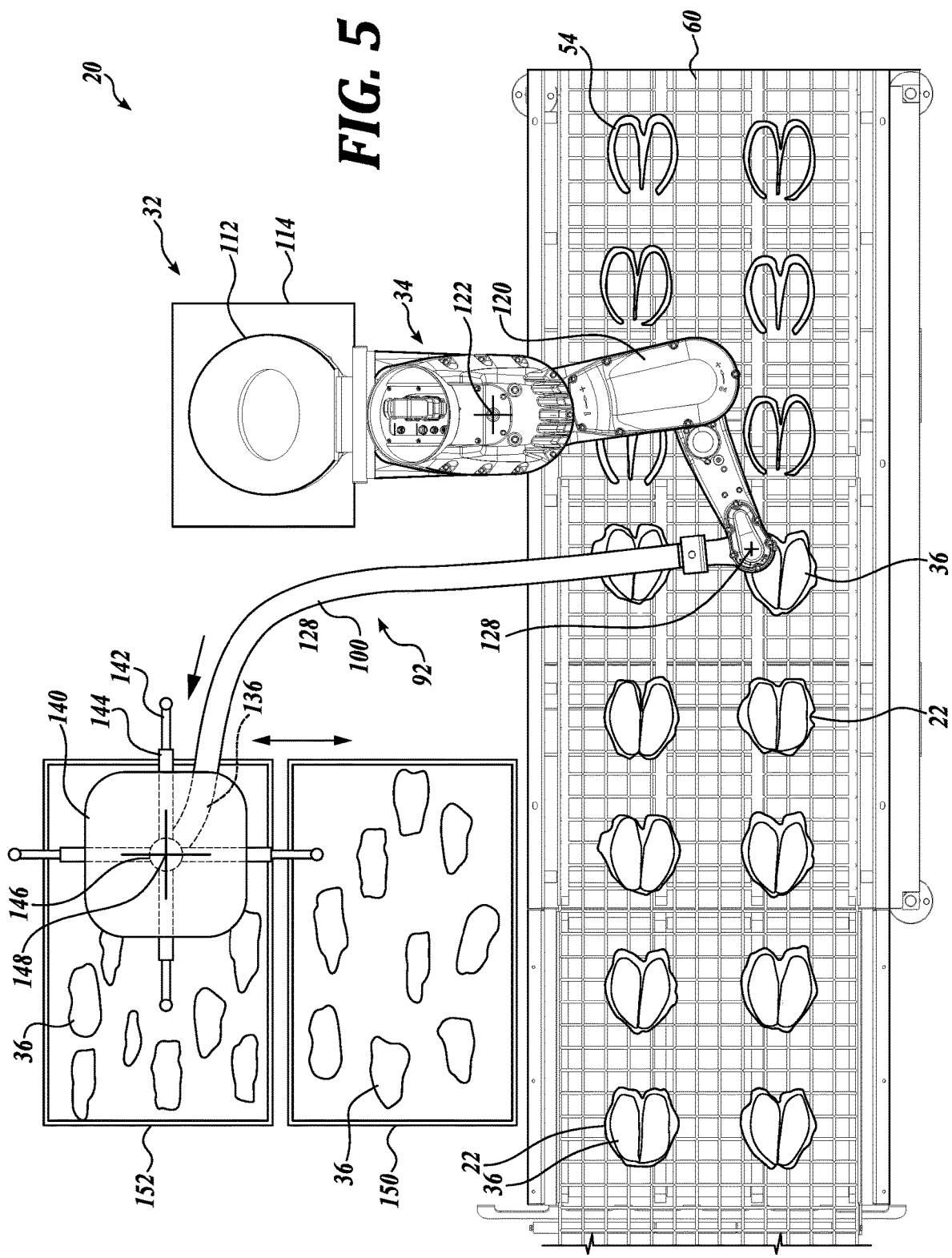
FIG. 5 is a view similar to FIG. 4 wherein the portioned food products are placed in storage bins.

Next, referring to FIG. 5, the hose/tube outlet end 136 is illustrated as positionable over different receptacles 150 and 152 in which the harvested food product items 36 are deposited. As in FIG. 5, the hose/tube outlet end 136 may be positioned and moved from receptacle to receptacle by a delta robot 140.

However, the hose/tube outlet end 136 may alternatively be attached to and controlled by a simpler horizontal linear actuator (not shown) that spans above and across the receptacles 150 and 152. Although only two receptacles 150 and 152 are shown in FIG. 5, it can be appreciated that a larger number of receptacles can be utilized so as to more discretely divide the harvested food product items 36 based on one or more selected physical parameters, for example, weight, size, length, width, and/or thickness, etc.

Again, one advantage of the system 20 over typical pick-and-place systems is that the outlet end 136 of the hose/tube 100 need not move back and forth between the conveyor system 24 and the receptacles 150 and 152 in order to position or place the food items at the desired locations. As such, the rate of harvest of the food items from the conveyor system 24 can be very rapid, depending on the size of the food item, from about 200 to at least 400 food items per minute.

As will be appreciated with respect to the embodiment of the present disclosure shown in FIG. 5, the robotic actuator 34 as well as the delta robot 140 are controlled by the controller 40 and utilize information which originated from scanning system 28 to place the portioned workpieces in the correct receptacles 150 and 152 shown in FIG. 5.

The hose/tube 100 is shown in FIGS. 1-5 as being of a continuous, flexible construction. This enables both ends of the hose/tube to be moved about by the robot actuator 34 and the delta robot 140 in a very fast and precise manner. However, it can be appreciated that the hose/tube 100 could be constructed with, at least a portion thereof, rigid tubular material, especially if such portion is not subject to movement. For example, the hose/tube 100 may have a rigid tubular section intermediate the ends thereof which may be composed of flexible tubular material such as a flexible hose. One reason for such a construction is that due to the continuous and rapid movement of the hose/tube ends, over time wear of the hose/tube will occur from such movement as well as due to the food products 22 passing/sliding against the inside wall of the hose/tube when traveling through the interior of the hose/tube.

It will also be appreciated that the diametrical size of the hose/tube may vary depending on the size of the food products being harvested. In this regard, the internal diameter hose/tube can vary from about one-half inch to 3 or more inches to accommodate the size, mass, thickness, and other physical parameters of the food product portions 36 being harvested.

FIGS. 6, 7 and 8 illustrate a further embodiment of the disclosed delivery subsystem 92 which utilizes a ballistic launcher 102 that launches the food items 36 out through an outlet of the launcher in specific trajectories 154, 156, 157, 158 so that the food items land at desired locations, which in FIG. 6 may be on one of three takeaway conveyors 160, 162 and 164, which are positioned at different elevations alongside the conveyor 24. In FIGS. 7 and 8, the ballistic launcher 102 directs the food items in different trajectories, e.g., 156, so as to land in a desired receptacle 166, 168 or 170.

The ballistic launcher 102 is in the form of a short launching barrel 180 that projects a short distance beyond a vacuum generator 132 positioned between the launching barrel and the intake nozzle 90. It will be appreciated that the trajectory of the launched food items can be controlled in different manners, for example, by the rotational position of the nozzle about vertical axis 128 as well as by the level of vacuum generated at the generator 132.

In addition, a six axis robotic actuator can be employed so that the launching barrel 180 can be tilted upwardly and downwardly relative to the horizontal about two axes. As can be appreciated, this may be helpful in achieving the correct launch angle and launch direction and thus the desired trajectory 154, 156 or 157 when desiring to place the food items on conveyors 160, 162 and 164. As shown in FIGS. 6 and 7, backstop screens 181 are used to prevent the launched food items from overshooting the intended conveyor or receptacle It will be appreciated that the controller 40 is operable to control the position and orientation of the nozzle 90 and thus the launching barrel 180, as well as the level of vacuum generated by vacuum generator 132. In situations in which a six-axis robotic actuator is used, the controller also controls the tilt angle of the launching barrel 180. The controller is aware of the size, shape, weight, and other physical specifications of the workpieces being harvested, and thus is capable of not only directing the delivery subsystem 92 to direct the harvested work product to the correct takeaway conveyor or receptacle, but also functions to control the level of vacuum at the vacuum generator 132 so that the workpiece is launched with the correct level of force or energy so as to successfully arrive at the desired locations.

Pressure sensors 182 and 184 may be mounted on the inlet nozzle 90 as well as on the hose/tube 100 so as to measure the pressure in the nozzle and the hose/tube as part of controlling the level of vacuum generated by the vacuum generator 132. Such pressure sensors can also indicate whether the nozzle 90 and/or the delivery hose/tube 100 may be blocked, partially or fully, so that corrective action, if necessary, may be undertaken. Pressure sensors 182 and 184 are articles of commerce. The outlet signals from the pressure sensors may be routed to the processor 42 and control signals may be routed from the processor by wireless or wired transmission.

One example of nozzle 90 is shown in FIGS. 9A-9H as constructed generally in the form of an elbow or right angle shape, having a body 188 with downwardly directed opening 190. The body 188 extends upwardly from the opening 190 and then extends laterally to form a neck section 189 with a circular outlet 192 at the distal end thereof. The neck 189 can be of selected length. A flange 194 surrounds the outlet 192 of the nozzle for connection to the vacuum generator 132.

The nozzle 90 is attached to the lower end of the robotic actuator head 126 by a pair of elongate mounting bosses 196 and 198 extending upwardly from the upper surface of the nozzle body to provide attachment surfaces 200 and 202 to bear against the actuator head 126. Hardware members, not shown, extend downwardly from the actuator head 126 to engage within openings 204 formed in the upper surfaces of the bosses 196 and 198.

Figure 3:
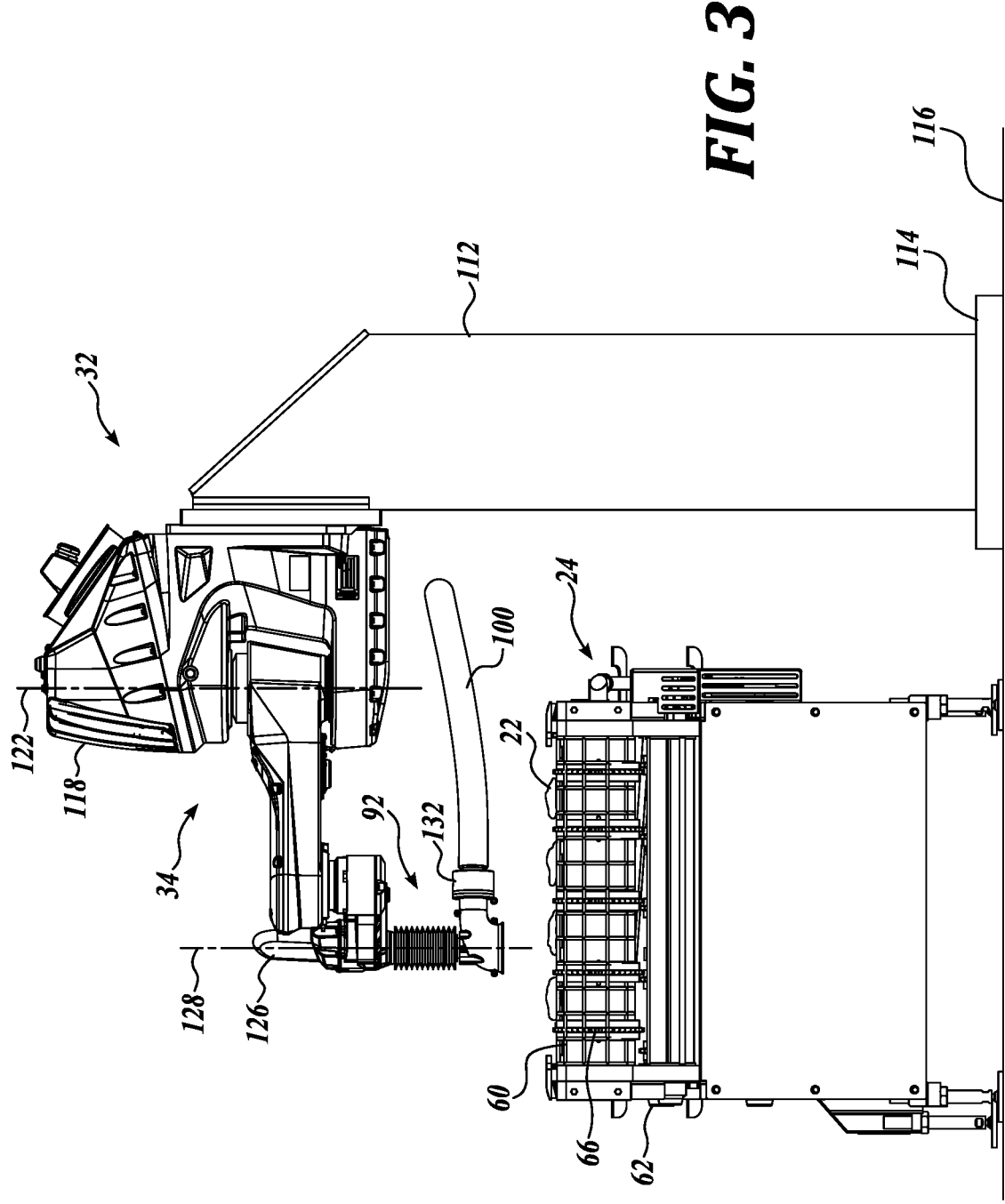
FIG. 3 is a side elevational view of FIG. 2.

As noted above, the flange 194 may be connected to the vacuum generator 132 and then delivery hose/tube 100 connected to a stub section projecting from the vacuum generator to engage the inlet end of the hose/tube 100, for example, as shown in FIG. 3. In the nozzle 90 shown in FIG. 3, the outlet 192 is generally horizontal, whereas in FIGS. 6, 7 and 8, the outlet is directed slightly upwardly at a launch angle. This can be achieved by simply adding a short extension to the nozzle shown in FIGS. 9A-9G, or alternatively the nozzle body can be shaped so that the outlet neck 189 is directed somewhat upwardly.

The nozzle body 188 is shown in the figures as having a circular inlet opening 190. As discussed below, the size of the opening can be selected based on the size of the food products being harvested.

Figure 14:
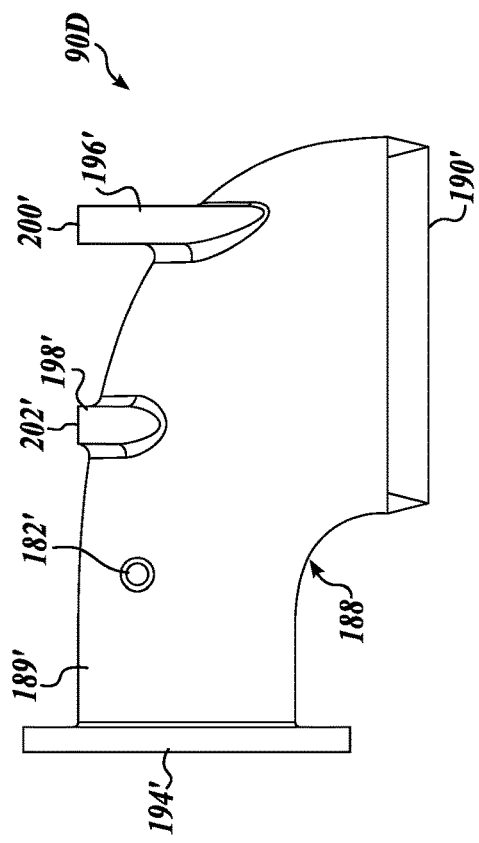
FIG. 14 illustrates another example of the suction nozzle of the present disclosure.

The inlet opening 190 is defined by a rim 210 that extends downwardly from the nozzle body. The rim 210 is shown with a bottom edge 212 of the rim can be blunt, squared off, or rounded. Further, as shown in FIG. 14, the edge 212 can be tapered in the downward direction so as to present a sharp bottom edge that may be useful to sever the food product to be harvested from trim or adjacent food product portions that may not have been fully cut by the cutter apparatus but are not to be harvested or are to be separately harvested from the food product piece being harvested.

Further, rather than presenting a uniform or continuous sharp edge in the downward direction, the rim bottom edge 212 may be serrated, toothed, or formed in other patterns or shapes to perform various functions, including separating the food product piece being harvested from the remainder of the food product. In this regard, the actuator head 126 of the robotic actuator may function to rotate the nozzle 90 to create a cutting action at the rim bottom edge 212.

A skirt 260, shown in FIG. 13, may extend around the opening 190 at or near the elevation of the rim 210. The skirt 260 may extend laterally outwardly from the nozzle opening to press against the top of food product other than the portion 36 being harvested, thereby to help ensure that only the harvested portion is drawn into the nozzle 90. In this regard, the skirt may extend or slope downwardly in the outward direction. The skirt may be composed of a flexible material so as not to damage the food product, but still apply a downward pressure on the food product that is sufficient to retain the food product in place while the portion 36 is being drawn into the nozzle.

Figure 13A:
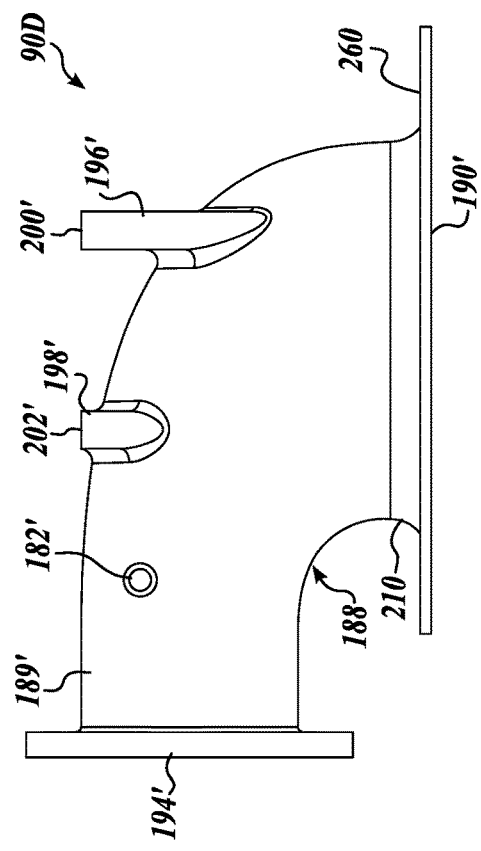
FIGS. 13A and 13B illustrate further example of the suction nozzle of the present disclosure.
Figure 13B:
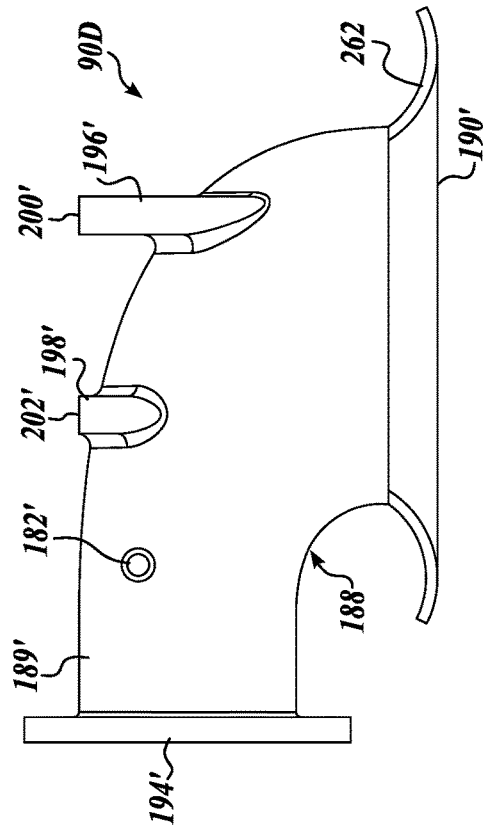

Also, the skirt may be formed in other configurations than shown in FIG. 13A. For instance, the skirt may be of an upwardly concave shape 262 in cross-section as shown in FIG. 13B so as not to apply pressure to the food item adjacent the nozzle inlet 190, but rather apply a downward pressure on the portion of the food item a desired distance away from the nozzle inlet. Skirts of other shapes or constructions may be utilized then as described above.

As also noted above, pressure sensors, such as sensor 182, can be mounted on the nozzle body 188 to sense the pressure within the nozzle body during operation of the system 20. More than one pressure sensor may be utilized. Further, the pressure sensor may be positioned at locations other than at the location shown in the figures.

As noted above, the size of the nozzle inlet opening is selected based on the area occupied by the food products being harvested. The diameter of the opening 190 can, for example, correspond to no more than the minimum distance across the food products (also known as a "minor dimension") being harvested so that the food products occupy or overlap the entire area of the opening 190. "Correspondence" in this regard means that the diameter of the nozzle opening is less than the minimum distance across the portion or area of the food product where the nozzle will contact the food product. A major dimension of the food product, for example, the length of the food product, can be significantly longer that the diameter of the nozzle opening, which does not present a problem since the food product will fold upon entering the nozzle, as discussed below.

If the entire area of the nozzle opening is covered by the food product, a maximum suction force being generated at the nozzle opening 190 at the time the food product begins entry into the nozzle 90. This maximum suction force acts on the food product to cause the food product to fold as it enters into the nozzle since the cross-sectional area of the nozzle will be less than the area of the food product as viewed from above. Also, as to nozzle opening is being closed off by the food product, the air speed into the nozzle increases resulting in greater suction being created.

If there is significant friction resistance between the food product and the interior surface of the nozzle, this can be sensed by the pressure sensors 182 so that the controller can cause the vacuum generator 132 to increase the vacuum level at the nozzle opening or air flow level through the nozzle if needed. Moreover, the pressure sensor will also be able to determine if the nozzle is plugged so that remedial action can be undertaken.

The robotic actuator in addition to locating the nozzle 90 over the food product to be harvested also lowers and raises the nozzle relative to the food product. The controller controls the robotic actuator to place the nozzle at a desired elevation relative to the food item to be harvested. Such elevation may depend on the type and physical parameters of the food item being harvested. For example, it may not be required that the nozzle be lowered all the way down to the top surface of the food item. Rather as the nozzle lowers toward the food item, the suction from the nozzle may lift the food item into the nozzle.

The ideal vertical position of the nozzle relative to the food item may depend also on the construction of the conveyor belt 60, for example, whether an open weave belt or a solid metallic or plastic belt. Since, as described herein, the vacuum generated at the nozzle is by the volume of air flow into the nozzle, for a solid surface belt, the nozzle may need to be at a relatively higher elevation than in an open weave belt to allow sufficient air flow into the nozzle to create the necessary lifting force to raise the food product into to nozzle.

As will be appreciated, if the food product does not occupy the entire area, or substantially the entire area, of the nozzle inlet opening 90, there may not be sufficient suction force to lift the food product off the conveyor belt 60 and into the nozzle 90. This could be the result if the minimum dimension (a minor dimension) across the food product being less than the diameter of the nozzle, or perhaps because the nozzle is not placed correctly over the food product.

The placement of the nozzle with respect to the food product is controlled by the controller 40. The controller knows the shape and size of the portioned food product to be harvested as well as the location of the food product portion on the conveyor. The controller is able to position the nozzle 90 over the food product so that the entire area, or substantially the entire area, of the nozzle inlet is covered by the food product, assuming the food product is large enough to do so.

Due to the shape and/or size of the food product or due to imprecise location of the nozzle over the food product, the entire area of the nozzle inlet may not be covered by the food product. In some instances the present system may operate properly if 90% of the nozzle area is covered by the food product. In other instances the present system may operate properly if about 80% of the nozzle area is covered by the food product. In still other situations the present invention may operate properly if about 70% or less of the nozzle inlet area is covered by the food product. Various factors may affect what percent of nozzle area remains uncovered and the present system still operates properly, such as for example the thickness of the food product, the overall size of the food product, the overall mass or weight of the food product, etc.

In addition to controlling the robotic actuator 34 so as to position the nozzle 90 at proper locations when harvesting food products or other work products, the controller may also control the robotic actuator so as to position the center of the nozzle body opening 188 over the centroid of the food product being harvested. This facilitates the entry of the food product into the nozzle body through the inlet opening 190. If the nozzle inlet opening 190 is located too far offset from the centroid of the food product, the possibility exists that the portion of the food product located directly below the opening may be lifted upwardly, but the remainder of the food product may resist upward movement into the nozzle body As will be appreciated, there may be a difference between the location on the food product where the entire area of the nozzle inlet opening 190 is occupied by the food product and the location of the centroid of the food product. The controller seeks to resolve such difference in optimum location of the nozzle, for example by moving the nozzle to more closely align the center of the nozzle with the centroid while still keeping the area of the nozzle covered with the food product. An algorithm may be used in this regard that takes into consideration the relative importance of seeking to ensure that the inlet opening of the nozzle is fully covered versus positioning the center of the nozzle over the centroid of the work product.

Although the foregoing factors and considerations with respect to placement of the nozzle 90 over the food product has been discussed with respect to nozzle 90 having a circular inlet opening 190, the same considerations apply to nozzles of other shapes, including those discussed below.

The controller is capable of recognizing whether a food product is either too small or too large or too heavy to be successfully harvested by system 20. If the food product is too small, an inadequate level of suction may be generated to be able to lift the food item into to nozzle. Or if the food product portion is too large in size, weight, mass, etc., the food product may not be able to fold into a small enough configuration to pass through the nozzle and/or the hose/tube. In such case, the controller instructs the harvesting system to not seek to remove such food products from the conveyor system 24, but instead allows the food product to pass by to be perhaps harvested by a robotic actuator with a different size and/or shape nozzle or to allow the food product to be manually harvested.

Rather than being circular in shape, the nozzle body opening 190 may be of other shapes, including shapes that correspond to the shape of the food product being harvested.

Figure 10:
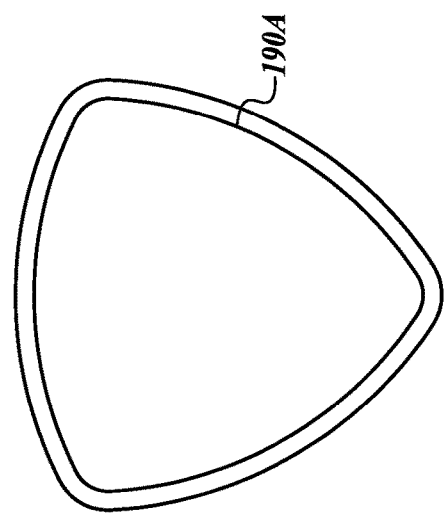
FIG. 10 illustrates the shape of an opening of the suction nozzle.

For example, FIG. 10 discloses a nozzle opening 190A which is generally triangular in shape. The opening 190A may be utilized to harvest food products of a shape similar to that shown in FIG. 10. Other potential shapes for the opening 190 may be oval, oblong, semi-circular, etc., to generally match the shape of the food product.

One potential drawback of utilizing a nozzle body opening corresponding to the shape of the food product is that for optimal operation of the system 20, the nozzle opening may need to be oriented to match the orientation of the food product on the conveyor system. Often this is not an issue due to the high speed operation of the robotic actuator 34. The robotic actuator is capable of rotating the nozzle 90 as the actuator head 126 approaches the food product to be harvested so that when the nozzle reaches the food product, it is in proper orientation about vertical axis 128 to match to the orientation of the food product on the conveyor system 24.

Figure 11A:
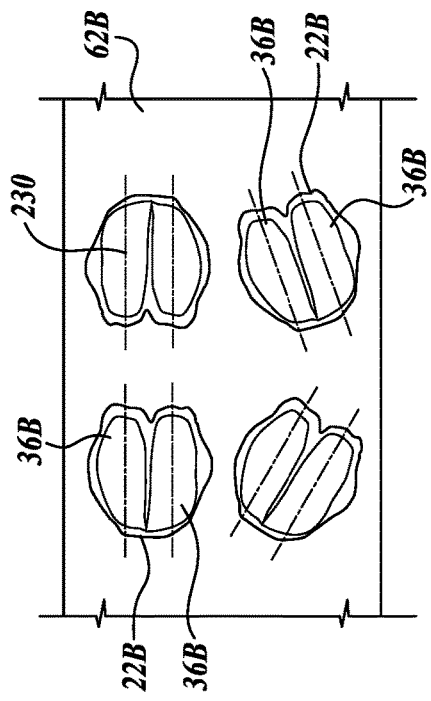
FIGS. 11A-11C illustrate how the design of a suction nozzle is determined.
Figure 11B:
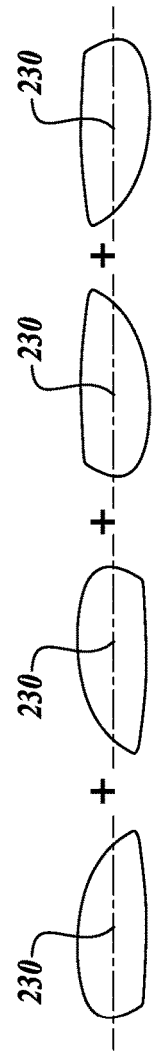
Figure 11C:
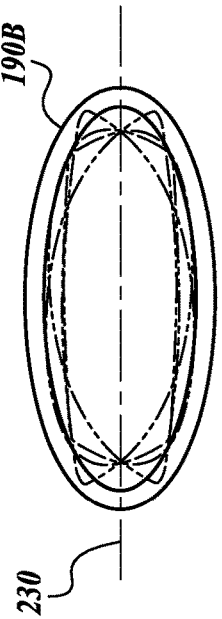

However, it may be desirable to shape the nozzle opening so that the nozzle opening may generally correspond to the shape of the food product, but enable to nozzle to approach the food product from more than one direction, or so that the nozzle may be in more than one orientation with respect to the vertical axis 128. For example, in FIG. 11A, the food products 22B may be in different orientations on the conveyor belt 62B. The nozzle opening 190B shown in FIG. 11C may be generally elliptical in shape so as to successfully harvest the depicted food product portions 36B by approaching the food product portions from any direction and aligning the longitudinal axis 230 of the opening 190B with the longitudinal axis of the food product portions 36B. As shown in FIG. 11B, the shape of the nozzle opening 190B is the result of superimposing the shapes of the food product portions 36B on top of each other when positioned in four different orientations. Parts of the food product may extend beyond the margins of the nozzle opening, but the area of the nozzle opening is covered, or substantially covered, by the food product.

Figure 12B:
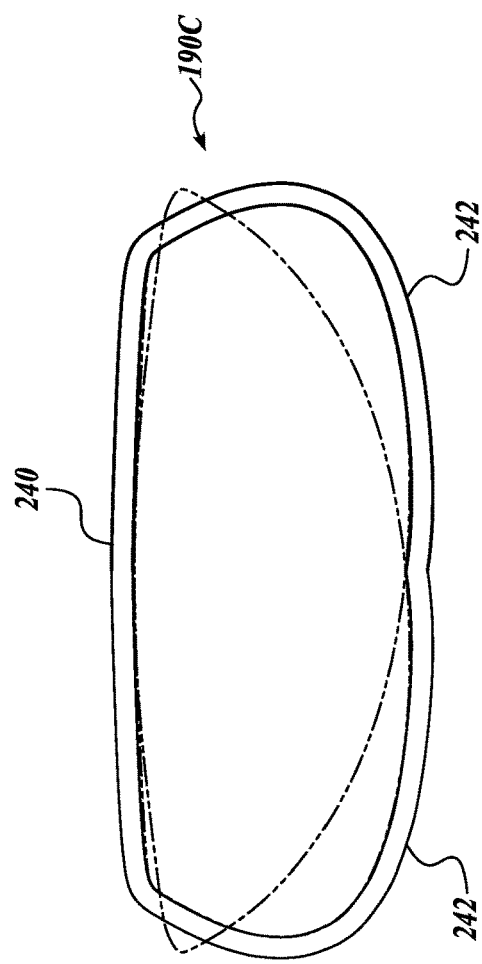
FIGS. 12A and 12B show another example how the shape of a suction nozzle is determined.
Figure 12A:
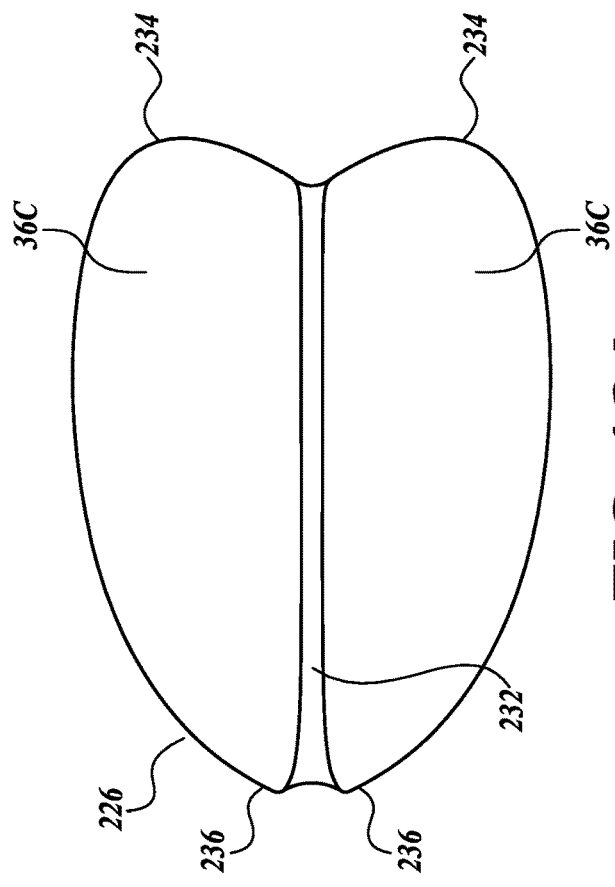

In addition, the nozzle opening may be designed so as to be able to pick up food products of similar complementary shapes. For example, FIG. 12A shows chicken breasts 22C that have been portioned into halves 36C so that the shape of each half is generally in the shape of one half of a heart shape, having a straight side edge 232 that intersects a curved lobe section 234 at the "top" of the chicken breast half which then arcs generally tangentially to the opposite tip end 236 of the straight side edge. The nozzle 190C is formed with a straight edge 240 corresponding to the straight side edge 232 of the chicken breast halves. The nozzle 190C also is formed with curved lobe portions 242 at both ends of the straight edge portion 240 so as to correspond to the lobe portions 234 of both of the chicken breast halves 36C. Thus, the nozzle 190C is able to pick up either of the chicken breast halves 36C shown in FIG. 12A by simply rotating the nozzle about axis 128 so that the straight edge portion 240 of the nozzle opening 190C overlies the straight edge portion 232 of the chicken breast halves 36C shown in FIG. 12. As discussed above, the nozzle is sized so that the entire area of the nozzle opening is covered, or substantially covered, by the chicken breast half. As such, the chicken breast half may extend beyond the outer perimeter of the nozzle opening. This is acceptable, since the chicken breast is pliable and will fold upon entering the nozzle.

Another approach may be to construct the nozzle 90 with dual openings of complementary shapes thereby enabling either of the openings to be utilized depending on the shape of the food product as well as the direction of approach of the nozzle to the food product. Appropriate valving can be provided so that vacuum is applied only to the selected nozzle opening. Such valving can be controlled by the controller 40, which as described herein also functions to control the other aspects of system 20.

Of course, other design considerations may be used to shape the inlet opening of the nozzle 90 in addition to or in lieu of that described above while still taking into consideration the shape of the food items being harvested.

Further, the system 20 can include a number of different nozzles 90A, 90B, 90C located in a storage rack 250 within reach of the robotic actuator 34, as shown in FIG. 8. The nozzles 90A-90C in FIG. 8 are of different sizes and shapes. The robotic actuator 34 can be controlled to select an appropriate nozzle for the food products being harvested. It is possible that such selection and replacement of the nozzle can occur continuously and quickly enough to accommodate changes in the shapes of the food products being carried by the conveyor system.

Another reason for having multiple nozzles is if a nozzle were to become clogged with food product, then that nozzle could be quickly replaced so as not to significantly reduce the harvesting rate of the robotic actuator. The clogged nozzle can be unclogged by personnel and then replaced, for example, in the storage rack 250 for subsequent use by the robotic actuator.

In addition, nozzle 90 may be replaced periodically to be sanitized. While the removed nozzle is being sanitized, a clean nozzle can be quickly coupled to the robotic actuator 34 so as to maintain the harvest rate of the system 20.

As a further alternative, a plurality of robotic actuators that are the same or similar to actuator 34 can be employed, with each actuator operating with nozzles of different size and/or shape openings so as to handle food products of different sizes and shapes. This could be especially beneficial if there is a significant amount of variation in the size and shapes of the food items to be harvested, even though all of the food items are of one particular type, for instance, chicken breasts or boned chicken thighs. As discussed above, for those food pieces that are sufficiently smaller or larger than the available nozzles or of sufficiently dissimilar shape, such outliers could be manually harvested downstream of the plurality of robotic actuators in use.

As a further alternative, nozzles such as nozzle 90 could be constructed with a plurality of openings of different shapes and sizes. Such nozzle could be rotated about vertical axis 128 to present the desired opening to the particular food part portion 36 being harvested. The controller 40 functions to switch the nozzle opening to the one that is to be presented to the food product portion being harvested and automatically disable the other nozzle openings.

Figure 15:
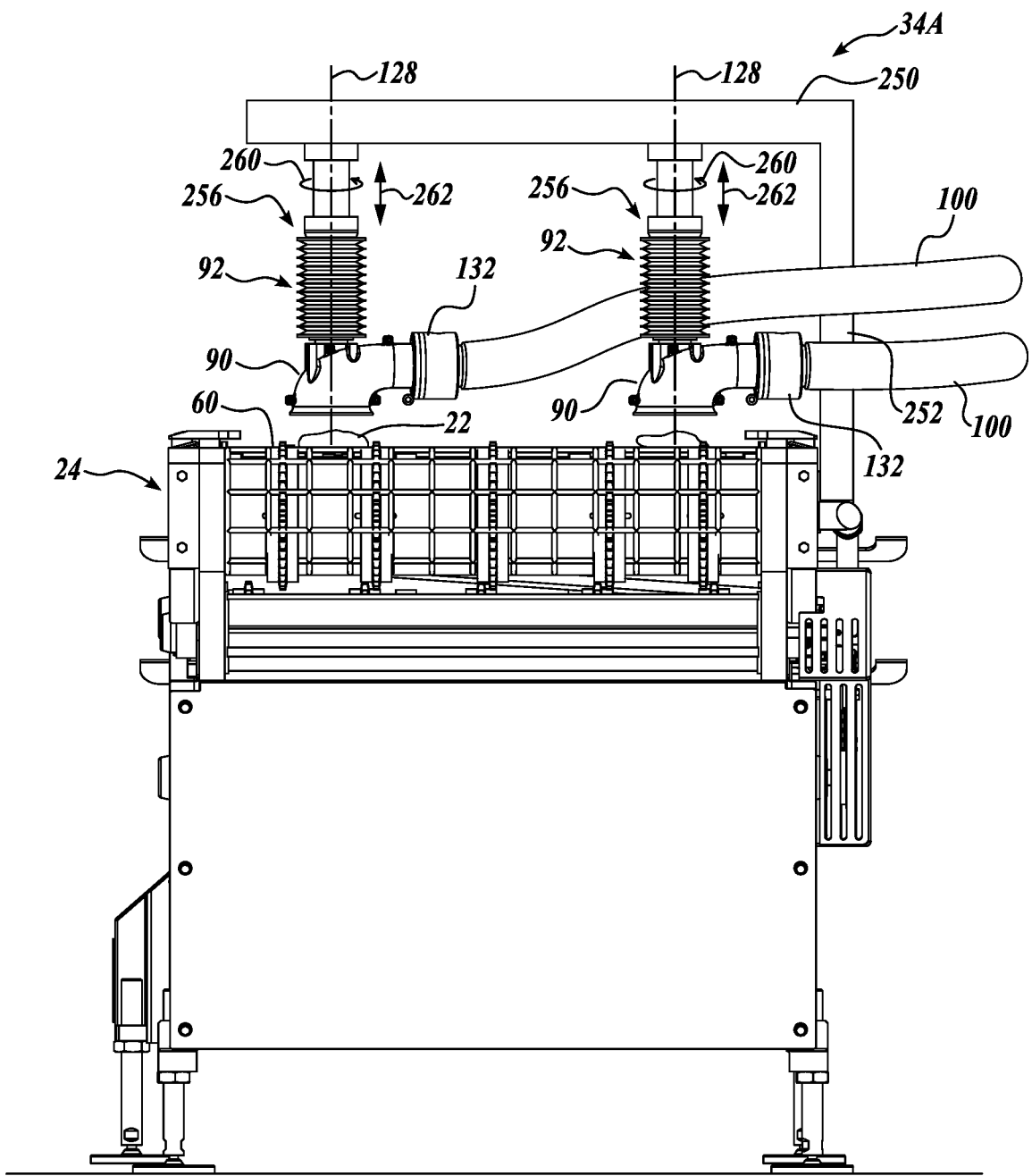
FIG. 15 illustrates further embodiments of the present disclosure.

FIGS. 15, 16, 17, and 18 disclose additional embodiments of the present disclosure utilizing various constructions for actuators 34A, 34B, 34C, and 34D. In FIGS. 15-18, the components that correspond to those illustrated and described in FIGS. 1-14 are identified with the same part number and the components that correspond, but are not the same as illustrated in FIGS. 1-14, are identified with the same Arabic prefix but with an alphabetic suffix. For example, the actuator illustrated in FIG. 15 is identified with the part number 34A.

With respect to FIG. 15, actuator 34A includes a pair of nozzles 90 that depend downwardly from an overhead frame structure 250 composed of an upright post 252 extending upwardly from the frame of the conveyor frame 64 to support a horizontal beam 254 that extends laterally across a major portion of the conveyor belt 60. The horizontal beam 254 supports two downwardly depending nozzle mounting assemblies 256. Nozzles 90 are mounted to the lower ends of the mounting assemblies 256 so as to be positioned over a lane of the conveyor on which the food products 22 are positioned.

The mounting assembly 256 can be of various configurations. For example, in a first configuration, the mounting assembly 256 may simply support the nozzle 90 in stationary position over the conveyor belt 60. This configuration is satisfactory if the food product 22 or other work product is positioned fairly accurately along a longitudinal lane of the conveyor belt and that the thickness of the food product or other work product is fairly constant or consistent. In this situation, the control system is operable to generate a vacuum at the nozzle inlet opening 190 when a food product portion 36 to be harvested passes beneath the nozzle opening 190 thereby causing the food product portion to be lifted upwardly from the conveyor belt and into the nozzle 90 in a manner as described above. From the nozzle 90, the food product is transmitted to a delivery location via delivery hose or tube 100.

It will be appreciated that rather than using a delivery hose 100, the nozzle 90 can be adapted to launch the food product portions 36 in specific trajectories so that the food item portions land at desired locations as described above with respect to FIGS. 6, 7 and 8. In this regard, a ballistic launcher, such as launcher 102, can be employed with nozzle 90. It is to be understood that in each of the additional configurations of the actuators 34A-34D shown in FIGS. 15-18, the harvested food product portions 36 can be delivered via the delivery tube such as hose 100 or launched through the air at desired trajectories using a launcher, such as ballistic launcher 102 shown in FIGS. 6, 7 and 8.

Rather than being entirely stationary, the mounting assembly 256 can be rotatable about vertical axis 128, as depicted by arrow 260, thereby to rotate the nozzle opening 190 in response to the shape of the food product portion 36, as described above. As a further alternative, the mounting assembly 256 can be powered to move in a vertical direction as depicted by arrow 262 so that the nozzle opening 190 can be positioned relative to the top surface of the food product portions 36 so as to adjust to the thickness of the food product portion. As a further alternative, the mounting assembly 256 can be adapted to both rotate about vertical axis 128 as depicted by arrow 262 and raise and lower along the axis 128 as depicted by arrow 262. The rotation and vertical movement of the mounting assembly 256 is controlled by the control system 40 in a manner as described above with respect to the embodiments shown in FIGS. 1-14.

Two delivery subsystems 92 are illustrated in FIG. 15 to place nozzles 90 over two parallel lanes along the length of the conveyor belt 60. It is to be understood that the food products 22 may be arranged in a different number of lanes along the length of the conveyor belt 60, for example, three lanes, four lanes, five lanes, etc. In this situation, a delivery subsystem 92 can be provided for each lane. Moreover, to increase harvesting production, more than one delivery subsystem 92 can be placed along a particular lane of the conveyor.

Figure 16:
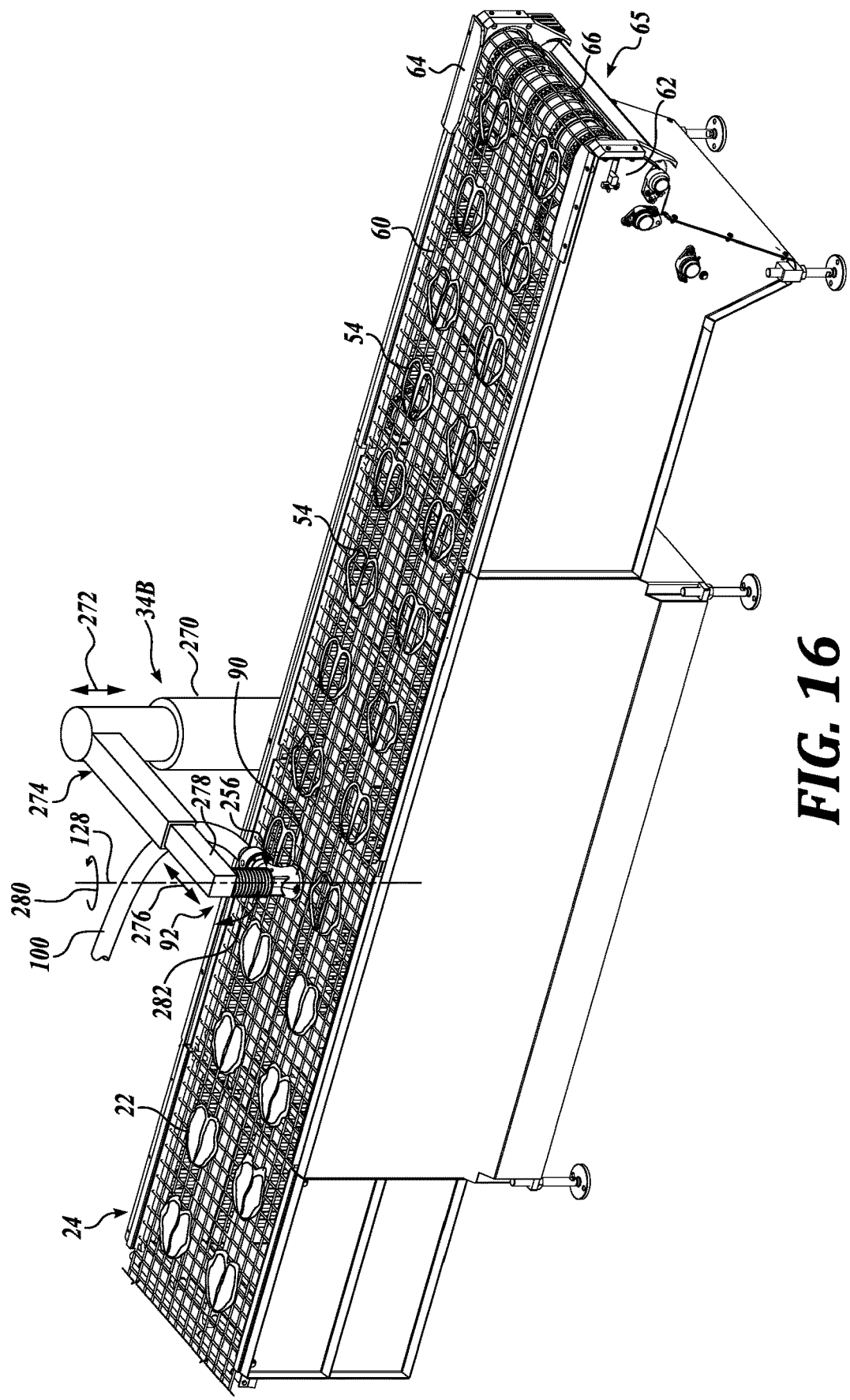
FIG. 16 illustrates further embodiments of the present disclosure.

Next, referring to FIG. 16, the actuator 34B is designed to move the nozzle 190 transversely across the width of the conveyor belt 60 and also optionally vertically along the height of axis 128 and also optionally rotationally about the axis 128. To this end, the actuator 34B includes a post structure 270 that can be configured to raise and lower as depicted by vertical arrow 272 or remain vertically stationary. A telescoping beam 274 cantilevers outwardly from the upper end of the post structure 270 to be movable laterally across the conveyor 60 as depicted by arrow 274. The telescoping distal section 278 of the beam 274 may be powered by any known means, for example, hydraulically, pneumatically, electrically, etc.

A mounting assembly 256 projects downwardly from the far end of distal section 278 to support and carry nozzle 90 in a manner similar to that described above with respect to FIG. 15. In this regard, the nozzle 90 can be rotated about axis 128 as depicted by arrow 280 and also move vertically along the height of the axis 128 as depicted by arrow 282. The vertical movement of the mounting assembly 256 can be in lieu of or in addition to the vertical movement of the post structure 270.

As in the embodiment shown in FIG. 15, the movement of the nozzle 90 in FIG. 16 is controlled by control system 40. Moreover, the operation of the nozzle 90 corresponds to that described above with respect to, for example, FIGS. 1-5 and 15.

As will be appreciated, the actuator 34B functions to move the nozzle 90 transversely across the conveyor belt 60, vertically along axis 128, as well as rotationally about axis 128. Moreover, the actuator 34B can be limited to: (1) simply transverse movement across the conveyor 60; or (2) a combination of transverse movement across conveyor 60 and vertical movement along axis 128; or (3) a combination of transverse movement across the conveyor 60 and rotational movement about axis 128; or (4) a combination of transverse movement across the conveyor 60, vertical movement along axis 128 as well as rotational movement about axis 128. As described above with respect to FIG. 15, the required or desired movement of the nozzle 90 can depend upon the nature and uniformity and other physical parameters of the food products 22 or other work products being harvested.

Figure 17:
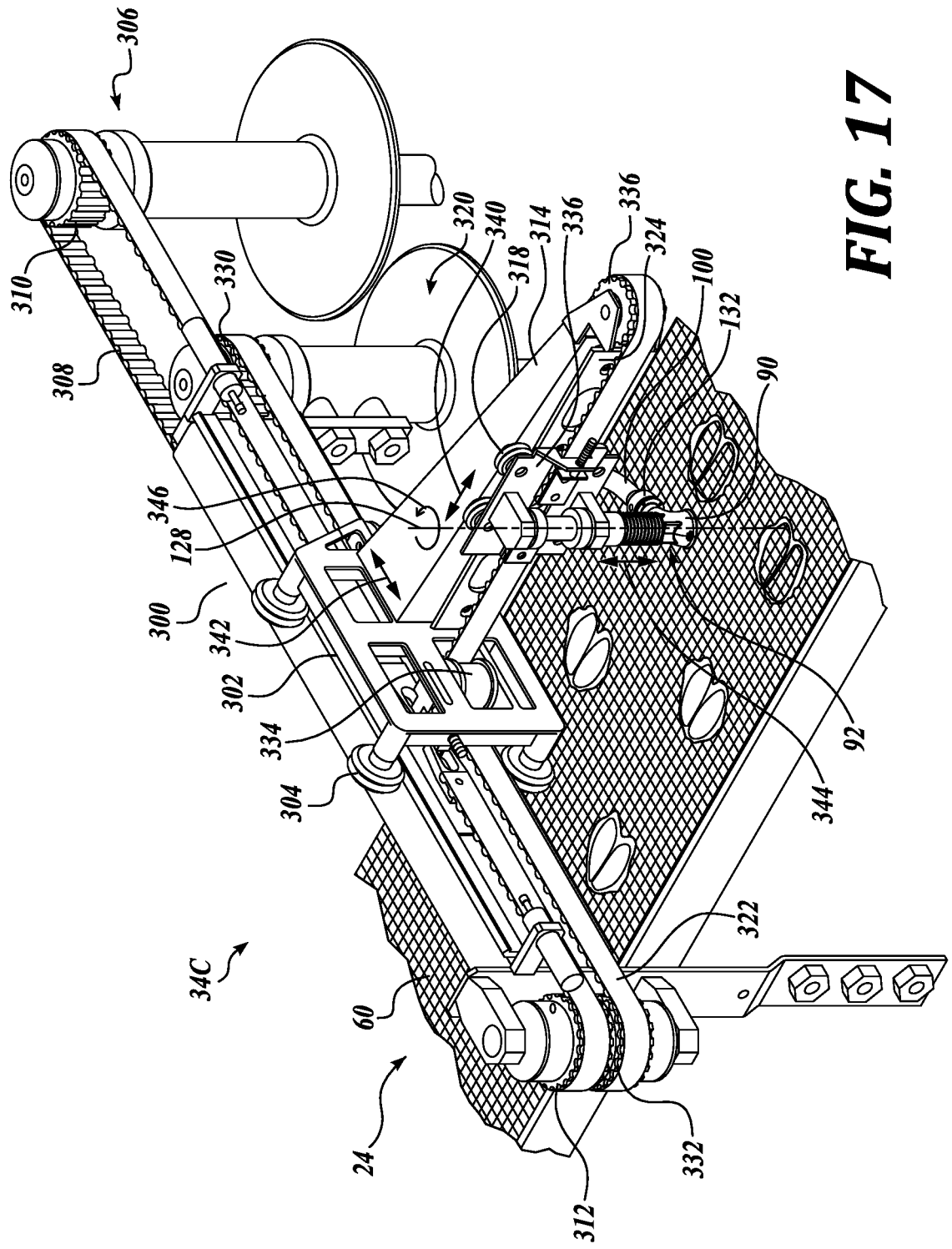
FIG. 17 illustrates further embodiments of the present disclosure.

Next, referring to FIG. 17, an actuator 34C is illustrated as enabling movement of the nozzle 90 laterally across the conveyor belt 60, longitudinally along the length of the conveyor belt as well as optionally vertically along the height of axis 128 extending through nozzle 90 and also optionally rotationally about the axis 128. To this end, the actuator 34C includes a support structure 300 extending across the conveyor 24 for supporting and guiding a carriage 302 having wheels 304 for rolling movement along the support structure in a direction transversely to the direction of movement of the conveyor. The carriage 302 is powered by a drive system including, in part, the motive system 306 that powers a drive belt 308 connected to the carriage 302. The belt 308 is powered by drive pulley 310. The belt also trains around an idler pulley 312. A second, longitudinal support structure or beam 314 is cantilevered outwardly from, and carried by, carriage 302 in a direction generally aligned with the direction of movement of the conveyor 24. A second, "longitudinal" carriage 316 is adapted to roll on wheels 318 along the beam 314 by a drive system which in part includes a second motive system 320 to power the longitudinal carriage 316 through a second drive belt 322 connected to carriage 316. An elongated track 324 is mounted on and extends longitudinally on the sidewall of beam 314 to guide wheels 318. The longitudinal carriage 316 is adapted to travel along track 324. The carriage 316 is moved back and forth along track 324 by the second motive system 320, constructed similarly to motive system 306, to power the drive belt 322 connected to carriage 316. The second belt 322 is driven by drive pulley 330. The belt 322 also trains around an idler pulley 332 located across the conveyer 24 from the drive pulley 330. The belt 322 further trains around idler pulleys 334 mounted on carriage 302 and an idler pulley 336 located at the distal end of beam 314.

Mounting assembly 256 functions to mount the nozzle 90 on carriage 316 so as to move with the carriage along the length of the conveyor belt 60 as depicted by arrow 340 as well as move with carriage 302 transversely to the length of the conveyor belt 60 as depicted by arrow 342. Also optionally, the mounting assembly 356 may be adapted to move the nozzle 90 vertically along axis 128 as depicted by arrow 344 along axis 128. Further alternatively, the mounting assembly 356 may be powered to rotate the nozzle 90 about axis 128 as depicted by arrow 346. As in the other actuators described and illustrated herein, the actuator 34C is also controlled by control system 40 as are the motive systems 306 and 320.

Figure 18:
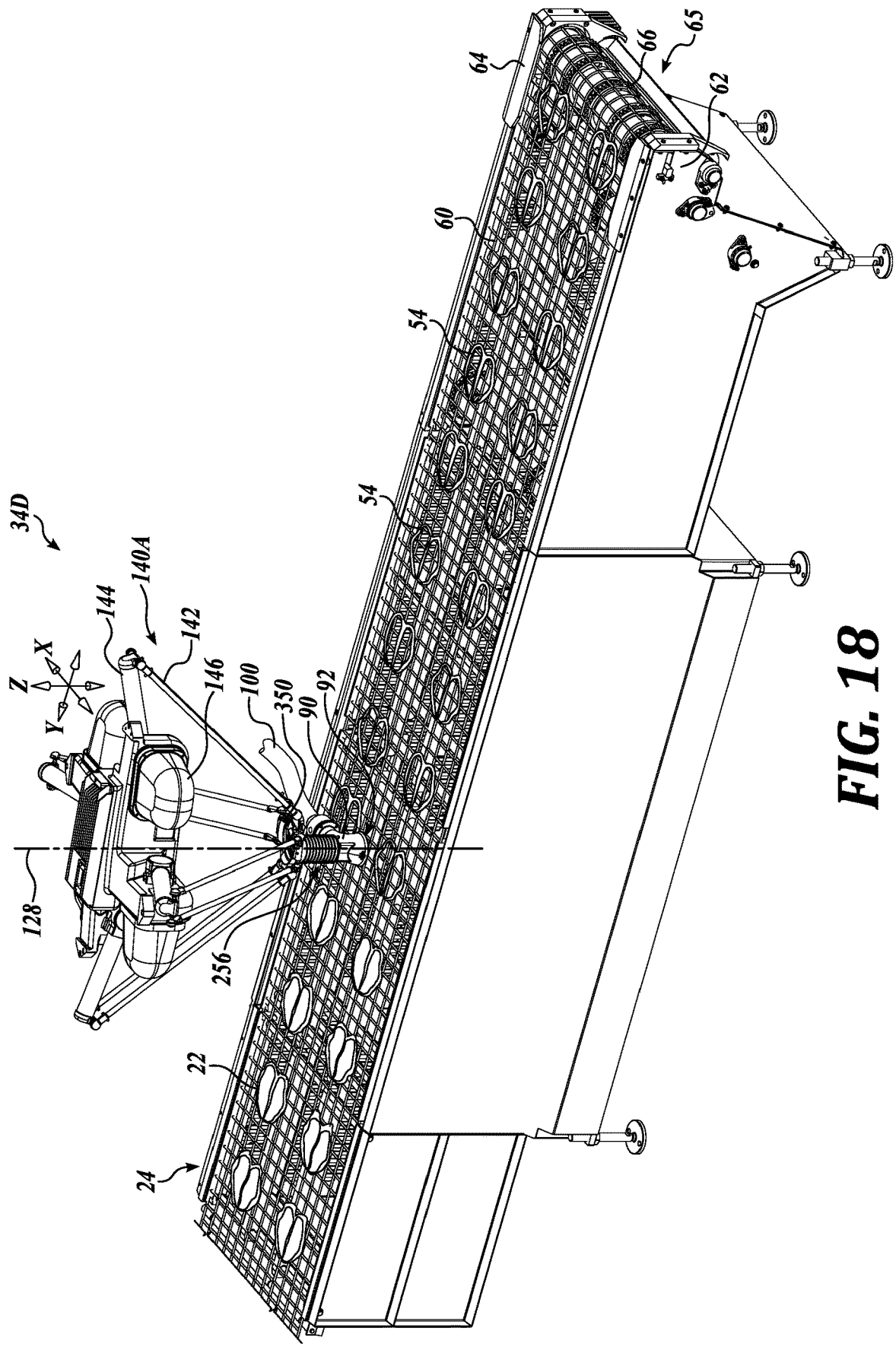
FIG. 18 discloses a further embodiment of the present disclosure.

Actuator 34D shown in FIG. 18 is in the form of a delta robot similar to the delta robots shown in FIGS. 4 and 5 and shown above. The components of the delta robot 34D shown in FIG. 18 are identified with the same part numbers as the delta robot shown in FIGS. 4 and 5. Regarding the delta robot 34D, the lower or distal ends of the lower extension arms 142 are connected to a carrier head or attachment 350 for mounting and supporting mounting assembly 256 which in turn supports nozzle 90. The delta robot 34D is capable of moving the nozzle 90 laterally across the conveyor 24, longitudinally along the length of the conveyor, vertically relative to the conveyor, as well as optionally to rotate the nozzle 90 about an axis 128 extending centrally through the nozzle 90. As such, the delta robot 34D is capable of positioning the nozzle 90 very precisely and quickly with respect to food products 22 so as to harvest portions 36 thereof in the same manner as when utilizing the other actuators described above.

The delta robot 34D may be mounted above the conveyor 34. In addition, more than one delta robot may be utilized in the harvesting system 20.

While illustrative embodiments have been illustrated and described, it will be appreciated that various changes can be made therein without departing from the spirit and scope of the invention. Such changes shall keep in mind that the systems of the present disclosure are aimed at processing and/or harvesting various types of food items that may be of variable physical parameters, including size, shape, thickness, weight, etc. and that may also be flexible and pliable so as fold into, or otherwise assume, a cross-sectional size that is smaller than a major dimension (e.g. maximum length) of the food item. Non limiting examples of such food items include raw meat, fish and poultry. Specific non limiting examples include boneless chicken breasts, boneless chicken thighs and chicken nugget portions.

As another alternative, the systems of the present disclosure may be used to pick up the trim remaining after a food product or other type of workpiece has been cut or portioned. For example for fragile work pieces, such as some types of fish, the trim could be picked up leaving the desired product on the conveyor belt.

Also, the systems of the present disclosure may be used to remove work pieces other than food items. Such work pieces may include, for example, workpieces composed of fabric, rubber, synthetic rubber, plastic, paper, cardboard, hardware cloth, plant material and other organic material, biomass, cellulose fiber material, etc.

As a further alternative, sensors other than pressure sensors can be used to sense the presence of work pieces in the delivery subsystem, including if the work pieces are jammed or stuck in the delivery subsystem. Such alternative sensors or sensing systems may include, for example, conductivity sensors, temperature sensors, optical sensors, air flow sensors, position sensors, radar sensors, sonar sensors and accelerometers.

While illustrative embodiments have been illustrated and described, it will be appreciated that various changes can be made therein without departing from the spirit and scope of the invention.

The embodiments of the invention in which an exclusive property or privilege is claimed are defined as follows:

1. A food processing system for processing food items, as the food items are being carried on a support surface of a conveyor, and removing the food items from the conveyor after processing, comprising:
   (a) a scanning system for scanning the food items and generating data pertaining to physical specifications of the food items including sizes and shapes of the food items and locations of the food items on the conveyor;
   (b) a removal system for removing the food items from the conveyor to deliver the food items to desired locations, the removal system comprising:
      a first nozzle having an inlet opening configured to receive the food items from the conveyor into the first nozzle;
      a discharge system in fluid receiving communication with the first nozzle for receiving the food items from the first nozzle and for launching the food items in a desired trajectory so that the food items travel through the air exterior of any conduit;
      a vacuum generator generating a vacuum at the inlet opening of the first nozzle; and
      an actuator to move and position the first nozzle to desired positions relative to the food items and to automatically rotate the first nozzle about an upright axis to aim the discharge system at a desired angular orientation about the upright axis; and
   (c) a control system:
      receiving the data pertaining to the physical specifications of the food items from the scanning system and the locations of the food items on the conveyor;
      controlling the actuator to position the first nozzle with respect to the food items to enable the first nozzle to pick up the food items from the conveyor, and controlling the actuator to rotate the first nozzle based on the data received from the scanning system;
      positioning the discharge system to control the trajectory of the food items launched into the air by discharge system to deliver the food items to the desired locations away from the conveyor while the first nozzle is capable of remaining located over the conveyor during the launching of the food items; and
      controlling an operation of the vacuum generator.

2. The food processing system according to claim 1, further comprising:
   a food processing station located upstream from the removal system, the food processing station configured for processing of the food items being carried by the conveyor; and
   wherein the control system receiving the data from the scanning system pertaining to the physical specifications of the food items and controlling the processing of the food items at the food processing station.

3. The food processing system according to claim 2, wherein the food processing station comprises a cutting system for cutting one or more portions from the food items; and the control system directing the cutting system to cut the food items.

4. The food processing system according to claim 1, wherein the discharge system comprises a ballistic launcher in flow communication with the first nozzle to launch the food items away from the first nozzle at the trajectory to deliver the food items to the desired locations.

5. The food processing system according to claim 4, wherein the control system controlling the position of the ballistic launcher to control the trajectory of the food items launched from the ballistic launcher.

6. The food processing system according to claim 1, wherein the control system controls the actuator to position the first nozzle with respect to one of the food items so that a center of the first nozzle is over a centroid of the one of the food items.

7. A harvester for a food processing system, in the food processing system food items being processed are carried on a conveyor, the food processing system including a scanning system for scanning the food items to generate data pertaining to physical specifications of the food items, including sizes and shapes of the food items and locations of the food items on the conveyor, the harvester picking up the food items from the conveyor and delivering the food items at one or more desired locations, the harvester comprising:
(a) a pickup system for picking up the food items from the conveyor, comprising:
a nozzle having an inlet configuration to receive the food items from the conveyor; and
a vacuum source for creating a vacuum at the nozzle;
(b) a discharge system in flow communication with the nozzle to launch the food items in a desired trajectory so that the food items travel through the air exterior of any conduit;
(c) an actuator to position the nozzle in a desired position relative to the food items to facilitate picking up the food items with the nozzle, the actuator automatically rotating the nozzle about an upright axis to aim the discharge system at a desired angular orientation about the upright axis; and
(d) a control system for receiving the data from the scanning system pertaining to the physical specifications of the food items, including the sizes and the shapes of the food items and the locations of the food items on the conveyor, and the control system controlling the actuator to position the nozzle with respect to the food items to enable the nozzle to pick up the food items from the conveyor and positioning the discharge system to direct the food items at the trajectory to place the food items at the one or more desired locations away from the conveyor while the nozzle is capable of remaining located above the conveyor while the discharge system launches the food items, the control system controlling the actuator to rotate the nozzle based on the data received from the scanning system.

8. The harvester according to claim 7, wherein the discharge system comprises a ballistic launcher in flow communication with the nozzle to launch the food items away from the nozzle at the trajectory for delivery of the food items to the one or more desired locations.

9. The harvester according to claim 8, wherein the control system controls the trajectory of the food items launched from the ballistic launcher.

10. The harvester according to claim 7, wherein the actuator is further capable of moving the nozzle in one or more directions selected from the group consisting of:
in an upright direction transverse to a support surface of the conveyor;
in a direction transverse to a direction of travel of the conveyor; and
in a direction along the direction of travel of the conveyor.

11. A system for producing cut portions from variably sized and shaped food items based on desired physical specifications of the cut portions and placing the cut portions based on the desired physical specifications of the cut portions at one or more desired locations, comprising:
(a) a conveyor system for conveying the food items;
(b) a scanning system for scanning the food items and generating data pertaining to the physical specifications of the cut portions including sizes and shapes of the food items and locations of the food items on the conveyor system;
(c) a cutting system for cutting the cut portions from the food items based on the desired physical specifications of the cut portions;
(d) a pickup system for picking up the cut portions from the conveyor system, comprising:
a nozzle having an inlet configured to receive the cut portions from the conveyor system; and
a vacuum source generating a vacuum at the inlet;
(e) a discharge system in flow communication with the nozzle to launch the cut portions in a desired trajectory so that the cut portions travel through the air exterior of any conduit;
(f) an actuator coupled to the nozzle to place the nozzle in position relative to the cut portions to facilitate picking up the cut portions with the nozzle, the actuator automatically rotating the nozzle about an upright axis to aim the discharge system at a desired angular orientation about the upright axis; and
(g) a control system:
processing the data to determine the sizes and the shapes of the food items and the locations of the food items on the conveyor system;
determining cutting paths to cut the food items to achieve the desired physical specifications of the cut portions;
directing the cutting system to perform cutting of the food items along the cutting paths;
directing the actuator to position the nozzle with respect to the food items to enable the nozzle to pick up the cut portions; and
positioning the discharge system to launch the cut portions in the trajectory to deliver the cut portions at the one or more desired locations away from the conveyor system while the nozzle is capable of remaining located above the conveyor system, wherein positioning the discharge system includes controlling the actuator to rotate the nozzle based on the data received from the scanning system.

12. The system according to claim 11, wherein the discharge system comprises a ballistic launcher in flow communication with the nozzle to launch the cut portions away from the nozzle at the trajectory to deliver the food items to the one or more desired locations.

13. A harvester for harvesting work items being carried on a conveyor, the harvester removing the work items from the conveyor and delivering the work items at desired locations, the harvester comprising:
(a) a pickup system for picking up the work items from the conveyor, comprising:
a nozzle for picking up the work items from the conveyor;

a ballistic launcher in flow communication with the nozzle to launch the work items in a desired trajectory so that the work items travel through the air exterior of any conduit to deliver the work items to the desired locations; and a vacuum source for creating a vacuum at the nozzle sufficient to cause the work items to enter the nozzle and be launched from the ballistic launcher;

(b) an actuator to position the nozzle in a desired position relative to the work items to facilitate picking up the work items with the nozzle, the actuator automatically rotating the nozzle about an upright axis to aim the ballistic launcher at a desired angular orientation about the upright axis; and (c) a control system controlling the actuator to position the nozzle with respect to the work items to facilitate the nozzle picking up the work items from the conveyor and positioning the ballistic launcher to deliver the work items at the desired locations away from the conveyor, the control system configured to receive data and to control the actuator to rotate the nozzle based on the data.

14. The harvester according to claim 13, wherein the control system controls the trajectory of the work items launched from the ballistic launcher.

15. The harvester according to claim 13, wherein the nozzle is a member of a plurality of nozzles having inlet shapes and sizes to correspond to work items of different shapes and sizes, the plurality of nozzles detachably attachable to the actuator.

* * * * *